United States Patent [19]

Tanioka

[11] Patent Number: 5,315,382
[45] Date of Patent: May 24, 1994

[54] IMAGE PROCESSING APPARATUS
[75] Inventor: Hiroshi Tanioka, Yokohama, Japan
[73] Assignee: Canon Kabushiki Kaisha, Tokyo, Japan
[21] Appl. No.: 717,641
[22] Filed: Jun. 19, 1991
[30] Foreign Application Priority Data
  Jun. 20, 1990 [JP] Japan .................... 2-163605
[51] Int. Cl.⁵ .......................................... H04N 1/46
[52] U.S. Cl. .................... 358/523; 358/462; 358/464; 358/465; 358/467; 358/470; 358/527; 358/528; 358/524; 358/529
[58] Field of Search ........... 358/400, 401, 429, 445, 358/443, 447, 448, 452, 455, 456, 457, 462, 464, 465, 466, 467, 470, 75, 80, 76, 77, 78, 79; 382/10, 11, 13, 54

[56] References Cited
U.S. PATENT DOCUMENTS

| | | | |
|---|---|---|---|
| 3,975,740 | 8/1976 | Distler et al. | 358/75 |
| 4,538,160 | 8/1985 | Uchiyama | 358/75 |
| 4,723,129 | 2/1988 | Endo et al. | 346/1.1 |
| 4,740,796 | 4/1988 | Endo et al. | 346/1.1 |
| 4,958,219 | 9/1990 | Kadowaki | 358/75 |
| 5,008,742 | 4/1991 | Shigaki et al. | 358/75 |
| 5,031,034 | 7/1991 | Shimizu et al. | 359/79 |
| 5,068,746 | 11/1991 | Ohsawa et al. | 382/54 |

Primary Examiner—Edward L. Coles, Sr.
Assistant Examiner—Jerome Grant, II
Attorney, Agent, or Firm—Fitzpatrick, Cella, Harper & Scinto

[57] ABSTRACT

It is determined whether an object pixel in entered image data resides on (a) part of a black character or line, (b) not on part of a black character or line but in close proximity thereto, (c) neither part of nor in close proximity to a black character or line. When it is determined that (a) holds, the object pixel is recorded using dark black ink only. When it is determined that (b) holds, a pixel comprising various color components is recorded using ink whose density is lower that that of ink having a designated density. When it is determined that (c) holds, namely that the object pixel is remote from a black character or line, the object pixel is recorded using the ink of the designated density.

33 Claims, 24 Drawing Sheets

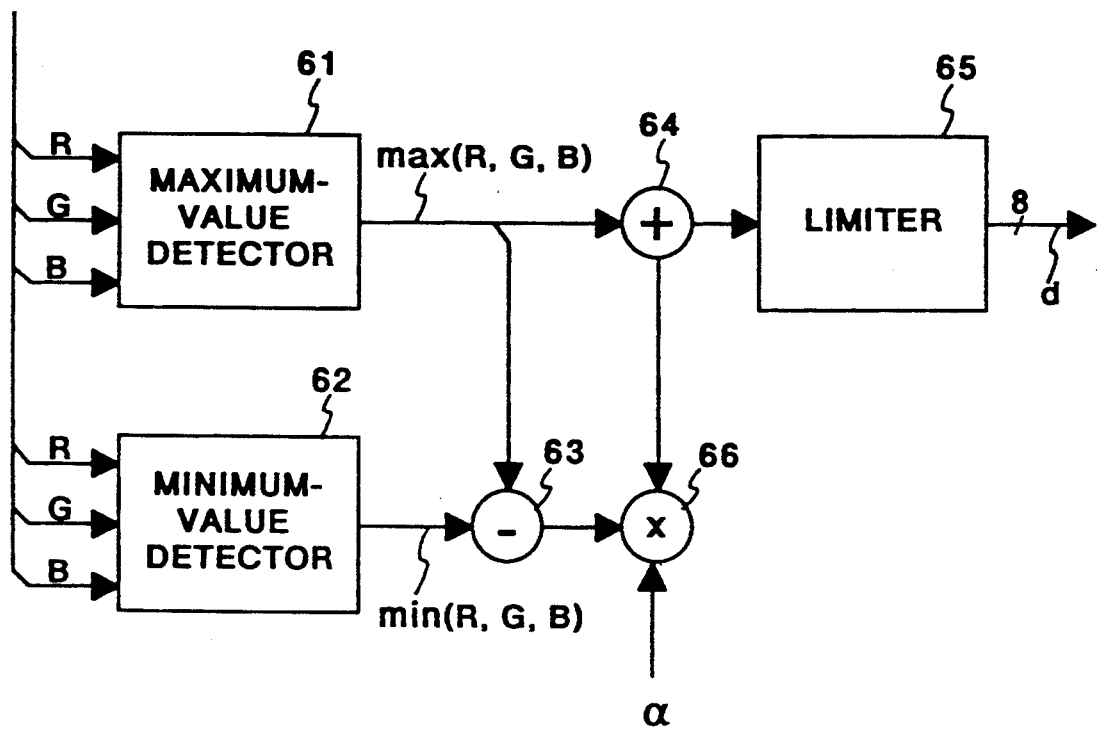
F I G. 3A

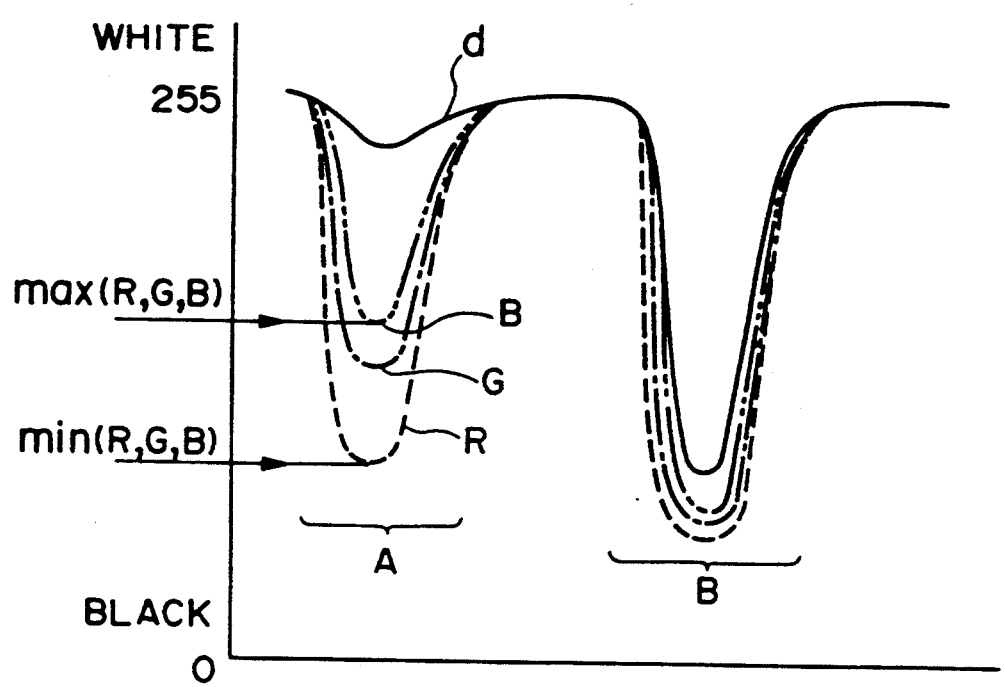
F I G. 3B

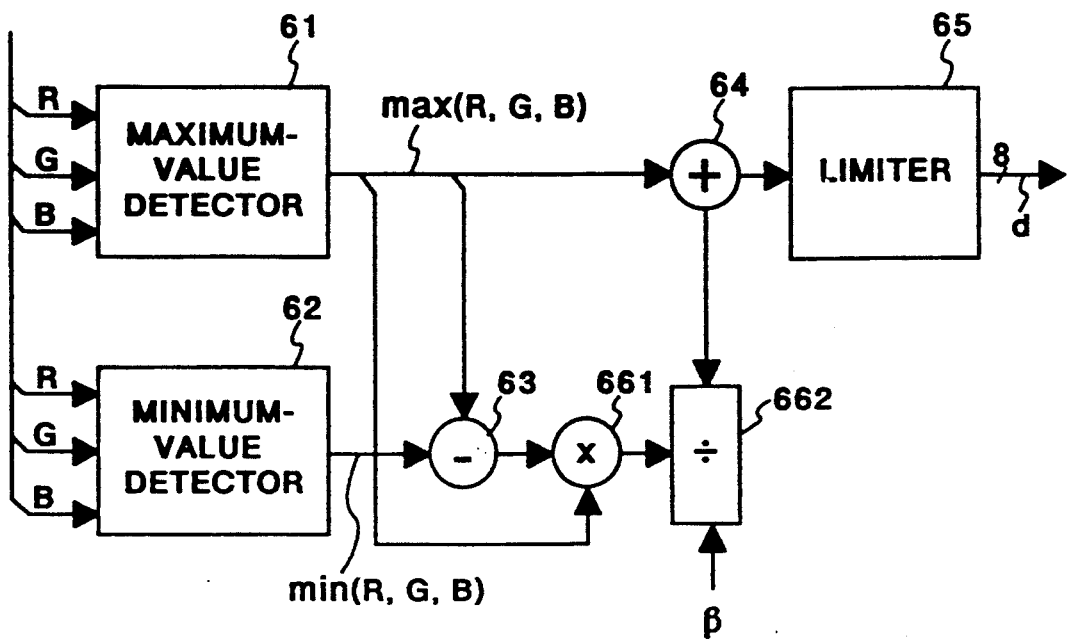
$$d = \max(R, G, B) + \frac{\max(R, G, B)}{\beta} \{ \max(R, G, B) - \min(R, G, B) \}$$
F I G. 3C
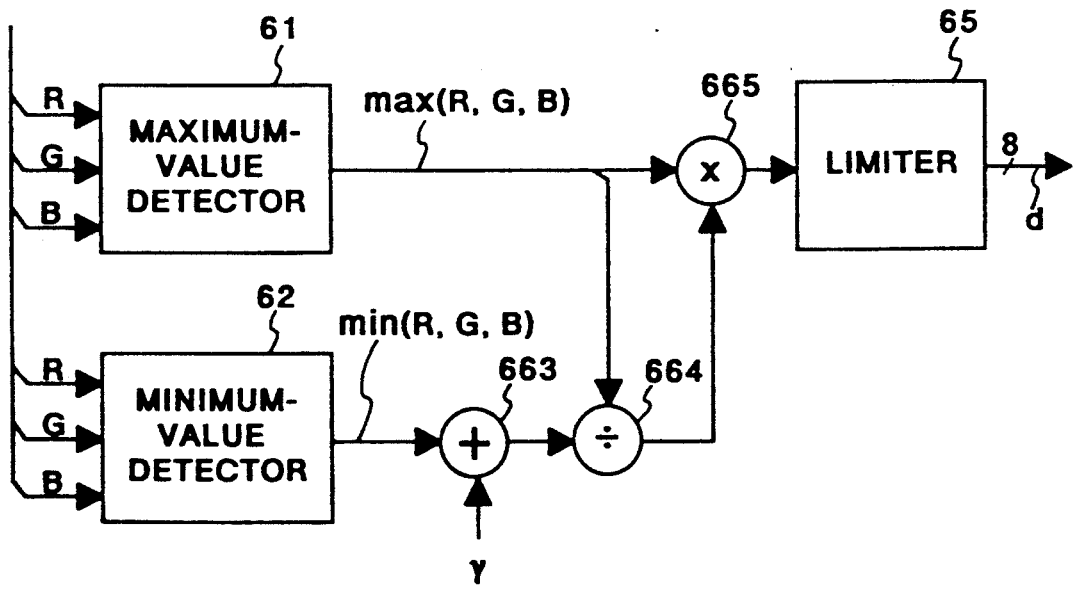
$$d = \max(R, G, B) \times \frac{\max(R, G, B)}{\max(R, G, B) + \gamma}$$
F I G. 3D

CONTROL OF C, M, Y INKS

| CMY | KB = 1 | KW = 1 | KB = 0 & KW = 0 |
|---|---|---|---|
| f DOT | 0 | h | f |
| h DOT | 0 | 0 | h |
| 0 | 0 | 0 | 0 |

FIG. 8A

CONTROL OF K INK

| K | KB = 1 | KW = 1 | KB = 0 & KW = 0 |
|---|---|---|---|
| f DOT | f | f | f |
| h DOT | f | h | h |
| 0 | f | 0 | 0 |

FIG. 8B

CONTROL OF C, M, Y INKS

| CMY | BG = 1 | | | BG = 0 | | |
|---|---|---|---|---|---|---|
| | KB = 1 | KW = 1 | KB = 0 & KW = 0 | KB = 1 | KW = 1 | KB = 0 & KW = 0 |
| f DOT | 0 | h | f | 0 | 0 | f |
| h DOT | 0 | 0 | h | 0 | 0 | h |
| 0 | 0 | 0 | 0 | 0 | 0 | 0 |

FIG. 9A

CONTROL OF K INK

| K | BG = 1, 0 | | |
|---|---|---|---|
| | KB = 1 | KW = 1 | KB = 0 & KW = 0 |
| f DOT | f | f | f |
| h DOT | f | h | h |
| 0 | f | 0 | 0 |

FIG. 9B

CONTROL OF C, M, Y INKS

| CMY | KB1 = 1 | KW1 = 1 | KB1 = 0 & KW1 = 0 |
|---|---|---|---|
| f DOT | 0 | 0 | f |
| h DOT | 0 | 0 | h |
| 0 | 0 | 0 | 0 |

F I G. 10A

CONTROL OF C, M, Y INKS

| CMY | KB2 = 1 | KW2 = 1 | KW2 = 0 & KB2 = 0 |
|---|---|---|---|
| f DOT | h | h | f |
| h DOT | 0 | 0 | h |
| 0 | 0 | 0 | 0 |

F I G. 10B

CONTROL OF K INK

| K | KB1 = 1 | KW1 = 1 | KB1 = 0 & KW1 = 0 |
|---|---|---|---|
| f DOT | f | f | f |
| h DOT | f | h | h |
| 0 | f | 0 | 0 |

FIG. 10C

CONTROL OF K INK

| K | KB2 = 1 | KW2 = 1 | KW2 = 0 & KB2 = 0 |
|---|---|---|---|
| f DOT | h | f | f |
| h DOT | h | h | h |
| 0 | h | 0 | 0 |

FIG. 10D

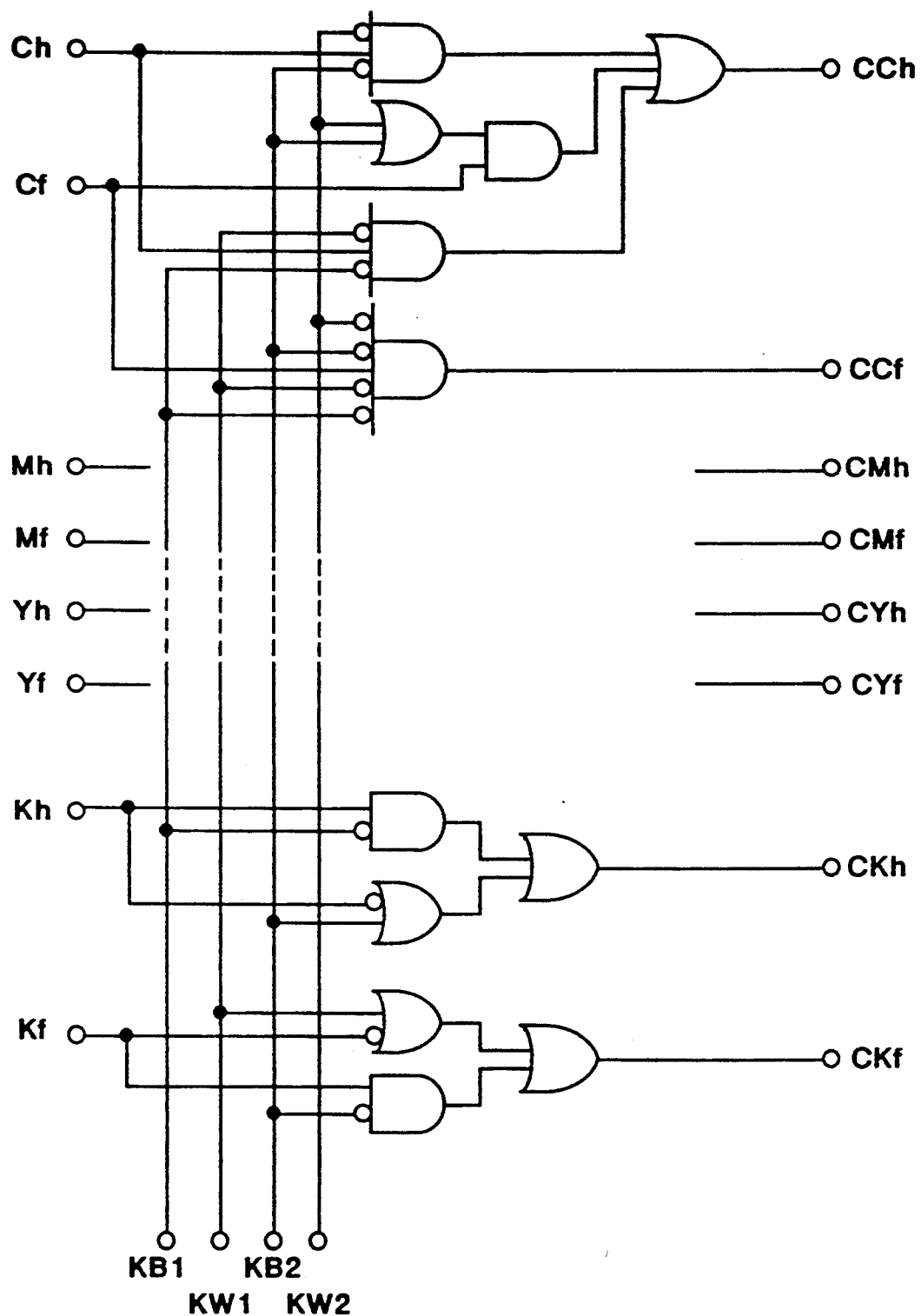
F I G. 13

CONTROL OF C, M, Y INKS

| CMY | KB1 = 1 | KW1 = 1 | KB1 = 0 & KW1 = 0 |
|---|---|---|---|
| 3 | 0 | 0 | 3 |
| 2 | 0 | 0 | 2 |
| 1 | 0 | 0 | 1 |
| 0 | 0 | 0 | 0 |

F I G. 19A

CONTROL OF C, M, Y INKS

| CMY | KB2 = 1 | KW2 = 1 | KW2 = 0 & KB2 = 0 |
|---|---|---|---|
| 3 | 2 | 2 | 3 |
| 2 | 1 | 1 | 2 |
| 1 | 0 | 0 | 1 |
| 0 | 0 | 0 | 0 |

F I G. 19B

CONTROL OF K INK

| K | KB1 = 1 | KW1 = 1 | KB1 = 0 & KW1 = 0 |
|---|---|---|---|
| 3 | 3 | 3 | 3 |
| 2 | 3 | 2 | 2 |
| 1 | 3 | 1 | 1 |
| 0 | 3 | 0 | 0 |

F I G. 19C

CONTROL OF K INK

| K | KB2 = 1 | KW2 = 1 | KW2 = 0 & KB2 = 0 |
|---|---|---|---|
| 3 | 3 | 3 | 3 |
| 2 | 3 | 2 | 2 |
| 1 | 3 | 1 | 1 |
| 0 | 3 | 0 | 0 |

F I G. 19D

IMAGE PROCESSING APPARATUS

BACKGROUND OF THE INVENTION

This invention relates to an image processing apparatus and, more particularly, to an image processing apparatus for recording an image using a recording material (ink, toner or the like) having a plurality of color components in a color copier, color facsimile machine, etc.

When a color image is recorded by an additive mixture of color stimuli, and especially when black slender lines and characters are recorded, based upon an image signal separated into colors (R, G, B), generally recording is performed by superimposing recording materials in the three colors of Y (yellow), M (magenta) and C (cyan) or the four colors of Y, M, C and K (black).

However, when an image is recorded by superimposing these recording materials having three or four colors, the following problems arise:

1. The portion where the materials overlap do not appear perfectly black.
2. Since it is difficult to superimpose the recording materials accurately, the colors become positionally displaced and the black color does not appear. In addition, the boundary with a tone image is rendered indistinct.
3. If recording is carried out based upon pseudo-halftone processing (such as processing based upon the dither method or error-diffusion method), for example, dots are not linearly continuous, and therefore slender black lines cannot be expressed at a high resolution.

Accordingly, in a case where an image is binarized, it has been contemplated to separate and identify black character portions or slender black-line portions from input image data and record these isolated portions using a single color, namely the color black. Though such an expedient is capable of solving the foregoing problems, there are instances where this processing comes to be applied also to the gray edges of ordinary images, thereby reducing picture quality.

SUMMARY OF THE INVENTION

An object of the present invention is to provide an image processing apparatus capable of producing excellent images in which characters and lines of a prescribed color are made to stand out from a neighboring image, and in which the characters and lines of the prescribed color will not undergo color displacement.

According to the present invention, the foregoing object is attained by providing an image processing apparatus comprising input means for inputting image data consisting of a plurality of color components expressed by n-levels (n>2) of values, converting means for converting the color component of n-level of values to m-level (2<m<n) of values, discriminating means for determining whether an object pixel is on part of a line of the predetermined color based upon the image data inputted by said input means, and correcting means for correcting color component of m-level of values of the object pixel based upon the determination made by said discriminating means.

Another object of the present invention is to provide an image processing apparatus capable of making characters and lines of a prescribed color relatively conspicuous.

According to the present invention, the foregoing object is attained by providing an image processing apparatus comprising input means for inputting image data consisting of a plurality of color components expressed by n-levels (n≧2) of values, extracting means for extracting the degree of a predetermined color of inputted data indicative of an object pixel, discriminating means for determining, based upon the degree of the predetermined color extracted by said extracting means, whether the object pixel is not on part of a line of the predetermined color but is situated at a position in close proximity to the line of the predetermined color, and correcting means for correcting each color component of an output color of the object pixel based upon the determination made by said discriminating means.

Another object of the present invention is to provide an image processing apparatus capable of producing excellent images in which characters and lines of a prescribed color are made to stand out from themselves and from the outside, and in which the characters and lines of the prescribed color will not undergo color displacement.

According to the present invention, the foregoing object is attained by providing an image processing apparatus comprising input means for inputting image data consisting of a plurality of color components expressed by n-levels (n≧2) of values, extracting means for extracting the degree of a predetermined color of inputted data indicative of an object pixel, discriminating means for determining, based upon the degree of the predetermined color extracted by said extracting means, whether the object pixel resides (a) on part of a line of the predetermined color, (b) not on part of a line of the predetermined color but at a position in close proximity to the line of the predetermined color, or (c) elsewhere, (i.e., neither on a part of nor in close proximity to the line of the predetermined color), and correcting means for correcting each color component of an output color of the object pixel based upon the determination made by said discriminating means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3A is a block diagram showing a black-signal generator in the black-character detector of the first embodiment;

FIG. 3B is a diagram for describing the meaning of a black signal outputted by the black-signal generator of FIG. 3A;

FIG. 3C is a block diagram showing a black-signal generator in a second embodiment of the present invention;

FIG. 3D is a block diagram showing a black-signal generator in a third embodiment of the present invention;

FIGS. 8A, 8B are diagrams for describing the control content of a recording signal controller in the first embodiment;

FIGS. 9A, 9B are diagrams for describing the control content of a recording signal controller in the second embodiment;

FIGS. 10A through 10D are diagrams for describing the control content of a recording signal controller in the third embodiment;

FIG. 13 is a circuit diagram showing the recording signal controller according to the third embodiment;

FIGS. 19A through 19D are diagrams for describing the control content of a recording signal controller in the fourth embodiment.

DESCRIPTION OF THE PREFERRED EMBODIMENTS

Embodiments of the present invention will now be described in detail with reference to the accompanying drawings.

Figure 1:
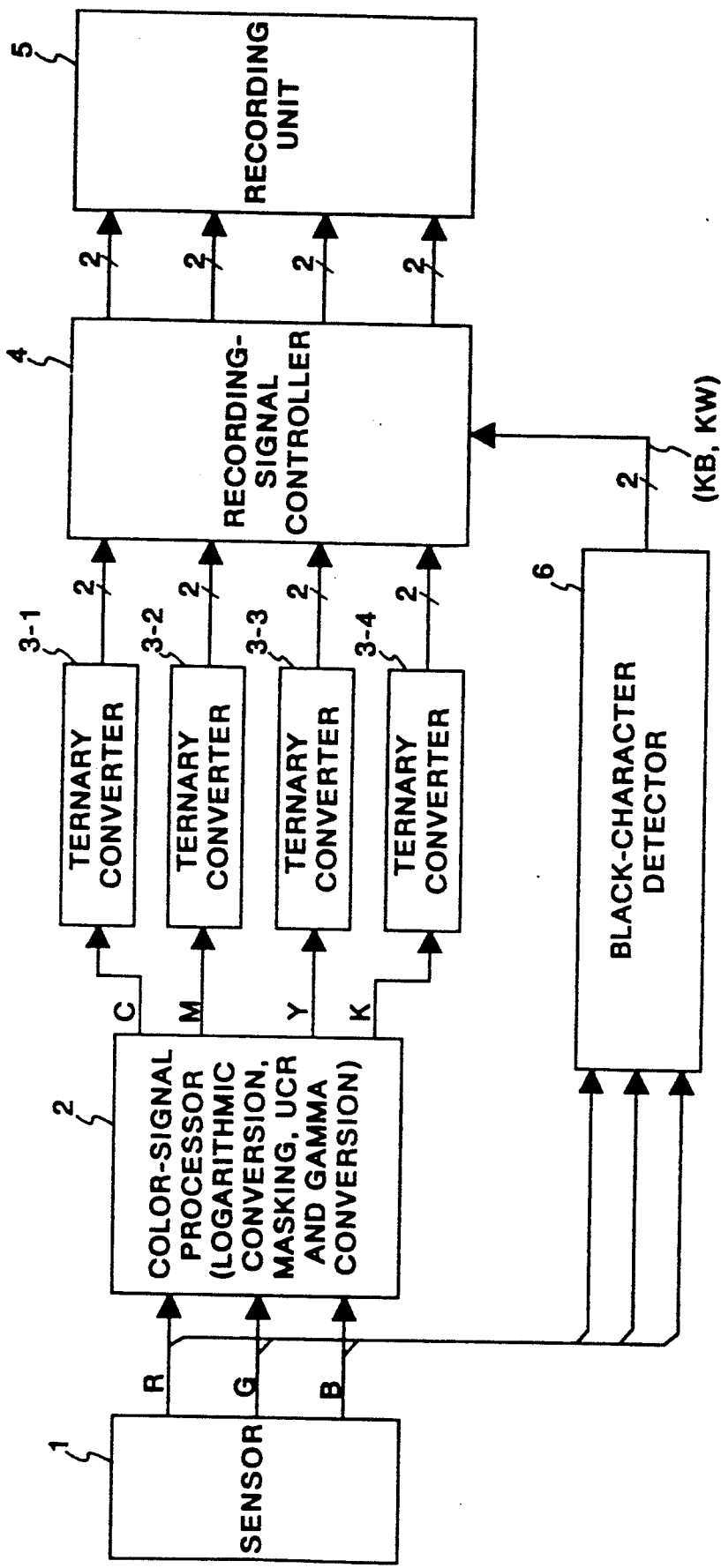
FIG. 1 is a block diagram illustrating a first embodiment of the image processing apparatus according to the present invention.

FIG. 1 is a block diagram illustrating an image recording apparatus according to a first embodiment of the present invention. The apparatus includes a CCD line sensor 1 which reads substantially one point on an original upon separating the point into the three colors R, G and B, and outputs the read image as a digital signal (in which there are eight bits for every color component). A color-signal processor 2 subjects the R, G and B three-color luminance signals to a logarithmic conversion to convert these signals into density signals Y, M and C. The processor 2 further subjects these signals to masking and UCR processing to obtain a total of four color signals, namely Y, M, C and K (black) recording signals, and then subjects these signals to a gamma conversion based upon the characteristics of the recording apparatus. The Y, M, C and K signals corrected by the gamma conversion are subjected to pseudo-half-tone processing by ternary converters 3-1, 3-2, 3-3 and 3-4, respectively, to obtain ternary values of image data. These ternary values have the following meaning, where (A,B)=(full-dot, half-dot) in the outputted two-bit signal from each ternary converter: (A,B)=(0,0) means that no recording is made; (A,B)=(1,0) means that recording is made using a dark dot; and (A,B)=(0,1) means that recording is made using a light dot. The ternary-converted image signals are applied to a recording-signal controller 4, which is a characterizing feature of the invention. The controller 4 performs control in the manner described below in order to express slender black lines at a high resolution.

The R, G, B signals from the sensor 1 are applied also to a black-character detector 6. The black-character detector 6 determines whether an object pixel is on an edge within the black portion of a character or line, whether this pixel is on a white portion that is not the black portion of a character or line adjacent the edge, or whether the pixel resides elsewhere, and outputs the result of this determination to the recording-signal controller 4 as a two-bit signal (KB, KW). Based upon the two-bit signal from the black-character detector 6, the recording-signal controller 4 controls the signals of the recording color components outputted by the ternary converters 3-1 through 3-4, produces signals which decide the actual recording colors, and outputs these signals to a recording unit 5. In this embodiment, the recording unit 5 is an ink-jet recorder having recording heads, which record in dark ink and light ink, for every color component Y, M, C and K. A ternary image can be recorded by using these recording heads properly.

The principal operation of the apparatus according to this embodiment will now be described.

In this embodiment, the color-separated luminance signals R, G, B (each of which consists of eight bits) inputted by the CCD line sensor 1 are eventually converted into eight-bit data indicative of the recording color components Y (yellow), M (magenta), C (cyan) and K (black). The conversion is made within the color-signal processor 2. The items of recording color-component data are converted into ternary data (two bits each) by respective ones of the ternary converters 3-1 through 3-4. For example, in ternary converter 3-1, the color-component signal is converted into a signal representative of one of three states. These three states indicate whether the recording of an object pixel is to be performed using dark cyan ink or light cyan ink, or whether the pixel is not to be recorded at all. Since the states are three in number, one bit is inadequate as the digital data, and therefore two bits are used. In order to simplify the description, hereinafter a dot recorded using dark ink shall be referred to as a "full dot" (or simply as an "F dot"), and a dot recorded using light ink shall be referred to as a "half dot" (or simply as an "H dot").

The ternary data produced for every color component can be used intact as an actual recording control signal to perform recording of an image. However, as mentioned above in the description of the prior art, this would give rise to the aforesaid problem wherein the portion of a black character in the read image is not recorded correctly and distinctly as a black character.

Accordingly, in this embodiment, it is determined whether the obtained ternary data regarding an object pixel is acceptable for use as is to perform recording, or whether the ternary data requires a correction. A correction is necessary when the object pixel is on an edge within the black portion of a character or line, and when the object pixel is on a portion, which is adjacent the edge of a character or line, but is not within the black portion of the character or line. If the object pixel is located elsewhere, a correction need not be applied and the data obtained by the ternary converters 3-1 through 3-4 can be used as recording control signals directly.

The black-character detector 6 is the device that determines whether an object pixel is on an edge within the black portion of a character or line, on a portion adjacent the edge of a character or line but not within the black portion of the character or line, or elsewhere. The recording-signal controller 4 corrects the ternary data based upon the determination made by the detector 6.

DESCRIPTION OF BLACK-CHARACTER DETECTOR

The black character detector 6 according to this embodiment will now be described.

Figure 2A:
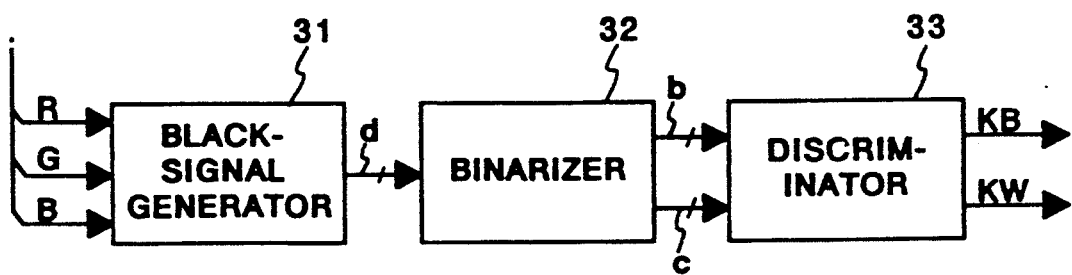
FIG. 2A is a block diagram showing a black-character detector in the apparatus of the first embodiment.

As shown in FIG. 2A, the black-character detector 6 comprises a black-signal generator 31, a binarizer 32 and a discriminator 33. The black-signal generator 31 generates, as a black signal d, data indicating degree of blackishness, namely how close to black an object pixel is. The binarizer 32 receives the black signal d, compares the object pixel with the pixels surrounding it and, based upon the comparison, outputs a binary signal b indicating whether the object pixel appears blackish and a binary signal c indicating whether the degree of change in the density of the object pixel is large or not. Based upon the data from the binarizer 32, the discriminator 33 outputs a signal KB=1 if the object pixel is on the black portion of a character or line, and a signal KW=1 if the object pixel is not on a black portion but resides near the black portion of a character or line. Accordingly, the condition KB=KW=1 cannot hold. The condition KB=KW=0 signifies a state other than the two mentioned above. Simply stated, this latter condition means that the object pixel is sufficiently far from the edge of a black character or line.

FIG. 3A is a block diagram illustrating the black-signal generator 31. The generator 31 includes a maximum-value detector 61 and a minimum-value detector 62, each of which compares the levels of the eight-bit RGB signals whenever a pixel is inputted thereto, for obtaining the maximum and minimum values of the levels as max(R,G,B) and min(R,G,B), respectively. A subtracter 63 computes the difference between these signals, namely max(R,G,B)−min(R,G,B), and a multiplier 66 multiplies the difference by a predetermined constant $\alpha$ and delivers the product to an adder 64. The latter adds the value delivered by the multiplier 66 to max(R,G,B) and delivers the sum to a limiter 65. When the sum delivered by the adder 64 exceeds a value "255" represented by eight bits, the limiter 65 limits the aforementioned sum to "255" to produce the black signal d as an output. If the sum from the adder 64 is less than "255", the sum is outputted directly as the black signal d.

The processing executed by the black-signal generator 31 will be described with reference to FIG. 3B. In this embodiment, the color signals represent luminance values. Accordingly, it can be judged that the object pixel is close to white if the values of these color signals are the same substantially and they are large. Similarly, the object pixel will be close to black if the values of these color signals are the same and they are small. For example, when R=G=B=0 holds, the object pixel is black. When the values of the color components are substantially the same, this indicates a pixel near an achromatic color; when the values of the color components are different, this indicates a pixel near a chromatic color. Accordingly, area "A" in FIG. 3B indicates section of a chromatic line, and area "B" indicates section of a blackish line.

The black signal d is expressed by the following equation in accordance with the relationship described above:

$$d = max(R,G,B) + \alpha[max(R,G,B) - min(R,G,B)]$$

where max(R,G,B) represents a gray-component signal, max(R,G,B)−min(R,G,B) a signal indicative of chromaticity, and $\alpha$ a color-suppression constant.

Physically, the meaning of max(R,G,B)−min(R,G,B) is degree of chromaticity, and max(R,G,B) represents represents a gray component (brightness). Therefore, when the value of max(R,G,B)−min(R,G,B) is large, namely when the object pixel is chromatic, this is multiplied by the constant $\alpha$ and the product is added to max (R,G,B). As a result, the black signal d can be converted in the direction of greater brightness. In other words, suppression can be applied in such a manner that the larger the value of the constant $\alpha$, the more the point having chromaticity becomes a white point. Thus, $\alpha$ is referred to as the color-suppression constant. Accordingly, by changing the value of $\alpha$, which is set in the multiplier 66, by a CPU (not shown), the degree to which the black component indicated by the black signal d is detected can be changed. The value of $\alpha$ may be changed by an operator operating a not shown panel. In this embodiment, the constant $\alpha$ is set to equal "1". In a case where max (R,G,B) is large and max(R,G,B)−min(R,G,B) is large, the maximum value 255, which represents a perfectly white point, is provided by the limiter 65 in FIG. 3A. Accordingly, the value of the signal d can be thought of as signifying the degree of blackishness. The black signal d enters the binarizer 32 in FIG. 2A.

Figure 4:
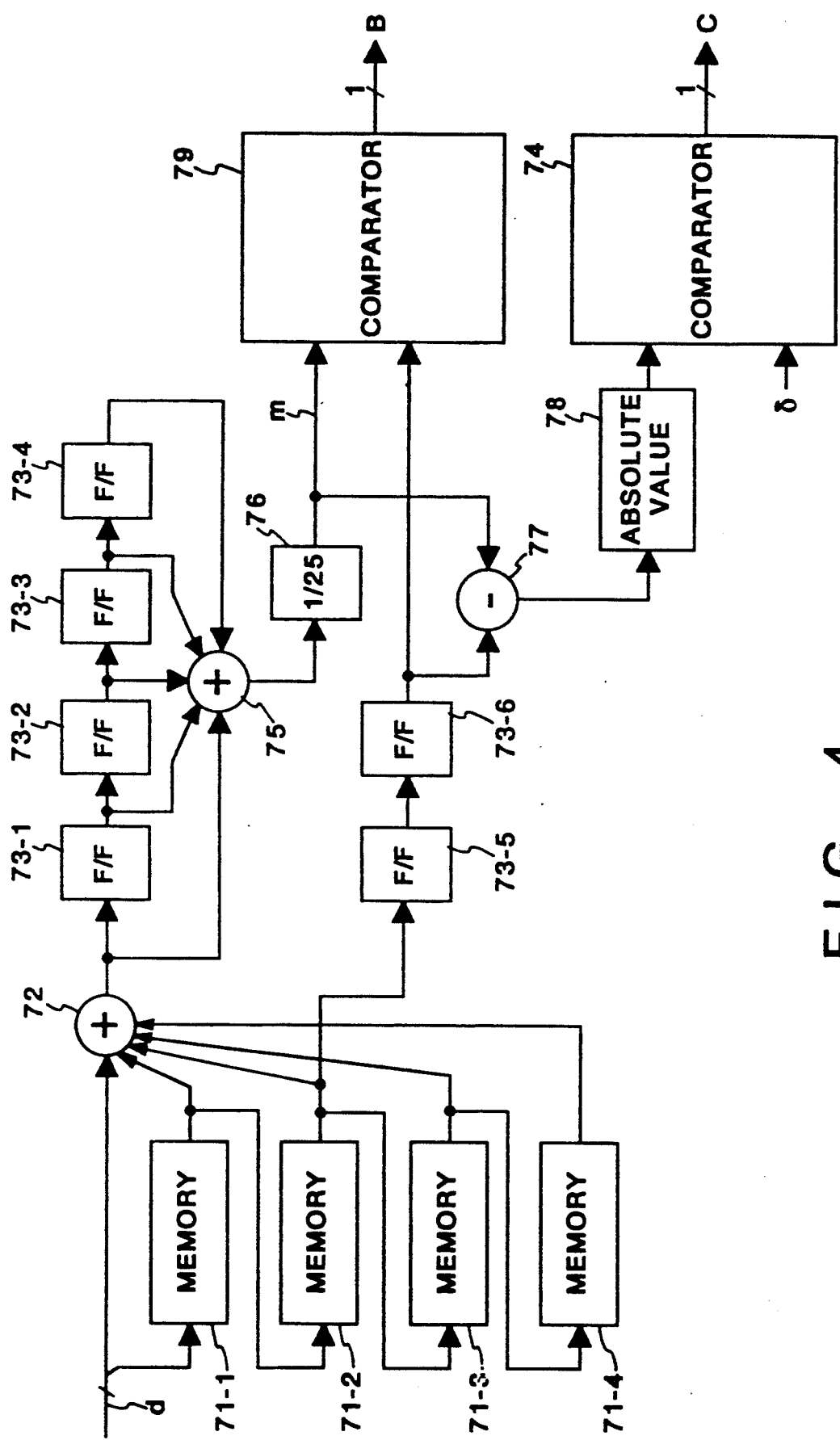
FIG. 4 is a block diagram showing a binarizing unit in the black-character detector of the first embodiment.

The binarizer 32, the block diagram of which is shown in FIG. 4, will be described next.

As shown in FIG. 4, the black signal outputted by the black-signal generator 31 is delayed one line and then by each of line memories 71-1 through 71-4. A total of five pixels of data, composed of the black signal d obtained directly from the black-signal generator 31 and the one-line delayed signals from each of the line memories 71-1 through 71-4, are added by an adder 72. The output of adder 72 is applied to F/Fs (flip-flops) 73-1 through 73-4, each of which delays the signal by one pixel and holds the result. Accordingly, five sum values result, and these are added by an adder 75. In other words, the adder 75 calculates the sum total of the black signals d in an area of 5×5 pixels. This output from adder 75 is divided by "25" in a divider 76, whereby a mean value m is calculated.

The center of the area composed of 5×5 pixels is adopted as the position of the object pixel. Accordingly, in order to achieve synchronization with the calculated mean value m, the signal outputted by the line memory 71 must be delayed by two pixels. To this end, the black signal d of the object pixel is delayed by two pixels by F/Fs 73-5 and 73-6.

A comparator 79 compares the data d from the position of the object pixel with the mean value m, which serves as threshold value, and outputs a binary value B exhibiting a higher definition. Specifically, the comparator 79 performs the following operation:

B=1 (black) when d<m holds;
B=0 (white) when d≧m holds.

A subtracter 72 calculates the difference between the mean value m and the value of the black signal d of the object pixel, and an absolute-value circuit 78 converts this difference value into an absolute value. A comparator 74 compares this absolute value with a constant δ to obtain a binary signal C. The logical meaning of the binary signal C is as follows:

C=1 when |d-m|>δ holds;
C=0 when |d-m|≦δ holds.

As for the physical meaning of these two signals, B is a signal obtained by binarizing the black signal to a high definition, while C is a signal obtained by binarizing the amount of change in level at the object pixel. In other words, when B=1 and C=1 both hold, this means that the change in density at the object pixel is greater than the constant δ and that the change is in the black direction. That is, the probability is high that this point is part of a black character or line.

However, there is also the possibility that the object pixel is part of a half-tone image expressed by a screen. Accordingly, in order to eliminate a case in which the object pixel is located in the black portion of a screen, the binary signals B, C are applied to the discriminator 33.

Figure 5:
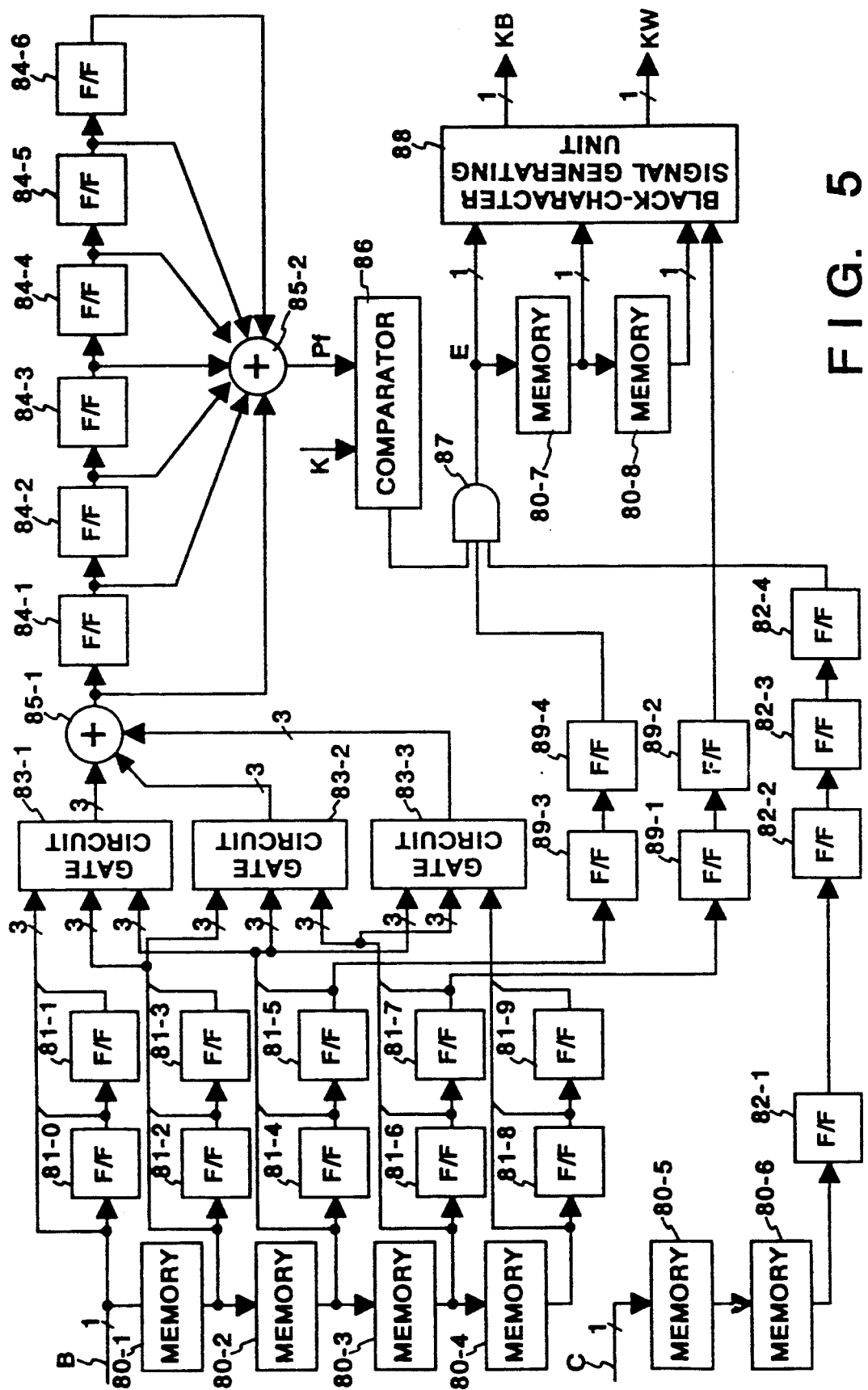
FIG. 5 is a block diagram showing an identifying unit in the black-character detector of the first embodiment.

FIG. 5 is a block diagram illustrating the discriminator 33.

As shown in FIG. 5, the inputted binary signal B is successively delayed by one line and held by each of line memories 80-1, 80-2, 80-3 and 80-4, and the same signal is delayed and held every pixel by F/Fs 81-0 through 81-9. Thus, the binary signals B of an area having a size of 5×3 pixels are held by these line memories and flip-flops. The position of the object pixel is taken to be the center of this area, namely the position indicated by the output of F/F 81-4. Thus, the binary data B of the eight pixels neighboring the object pixel is the data directly before input to the F/Fs 81-2, 81-4, 81-6 and the data outputted to the output terminals of F/Fs 81-2, 81-6, 81-3, 81-5 and 81-7. All of the data of the nine mutually adjacent pixels inclusive of the object pixel enters a gate circuit 83-2.

Similarly, a gate circuit 83-1 is supplied with binary signals indicative of a total of nine pixels, namely the pixel one line after the object pixel, i.e., the data at the output position of F/F 81-2, and the data of the pixels neighboring this pixel position. Also, gate circuit 83-3 is supplied with nine items of the B data, namely the pixel one line before the object pixel, i.e., the data at the output position of F/F 81-6, and the data of the pixels peripheral thereto. Though the details will be described later, each of the gate circuits 83-1 through 83-3 performs the following processing: It is determined what relationship the point at the center of the inputted 3×3 B-signal area has with the binary levels ("0" or "1") of the eight neighboring points, or more specifically, whether the point at the center of the corresponding 3×3 area is isolated from the peripheral points and has a level of "0" or "1". Each of the gate circuits 83-1 through 83-3 outputs a signal S which represents, by a value of 0 through 4, the degree of isolation of the point at the center. The larger the value of the signal S, the greater the possibility that the central pixel is a screen pixel. Conversely, if the value of the signal S is 0, the possibility that the central pixel is part of a character or line is high. The reason for this is that a character or line is a collection of dots connected in one dimension. However, whether or not the central point is part of a character or line cannot always be judged from just one point. Accordingly, the values S which indicate the degrees of isolation assigned pixel by pixel are added up in two dimensions to make the aforementioned judgment. In other words, the judgment is made using multi-valued data representing degree of isolation.

First, the signals S each indicative of three pixels in the line direction are added by an adder 85-1, and the sum is successively delayed one pixel and held by each of F/Fs 84-1 through 84-6. The output of adder 85-1 and the outputs of the F/Fs 84-1 through 84-6 are added by an adder 85-2. Assuming that the pixel delayed by two lines and four pixels from the most recently inputted image data is taken as the position of the object pixel, the adder 85-2 obtains the sum Pf of the data S composed of 3×7 pixels, the center of which is the object pixel. The characteristic quantity Pf signifies a two-dimensional spatial frequency. That is, the larger the sum Pf, the greater the "0"↔"1" reversal of the value of the binary data B in the neighborhood of the object pixel. Stated more simply, this means that the spatial frequency is high and that there are many two-dimensionally isolated dots. In other words, if the characteristic quantity P is small, there is a high possibility that the position of the object pixel is not on a screen.

E=1 when Pf≦K, C=1 and B=1 hold
E=0 at all other times

Accordingly, the value of Pf is compared with a predetermined constant K (4–5) by a comparator 86, and an AND gate 87 takes the AND between the position of the object pixel, namely a binary signal C obtained by a two-line delay via memories 80-5, 80-6 and a four-pixel delay via F/Fs 82-1 through 82-4, and the binary signal B at the same position. If the output E of the AND gate 87 is "1", then the position of the object pixel is judged to be on part of a black character or line.

The signal E and the signal B, which is delayed from the position of the object pixel by one line and also by two pixels via F/Fs 89-1 and 89-2, enter a black-signal generating unit 88. This produces the black-character signals KB and KW, which are the final outputs of the black-character detector 6.

The internal structure of the gate circuits 83-1 through 83-1 will now be described. Since these gate circuits are identical, only the internal structure of gate circuit 83-1, shown in FIG. 6, will be illustrated and described here.

Figure 6:
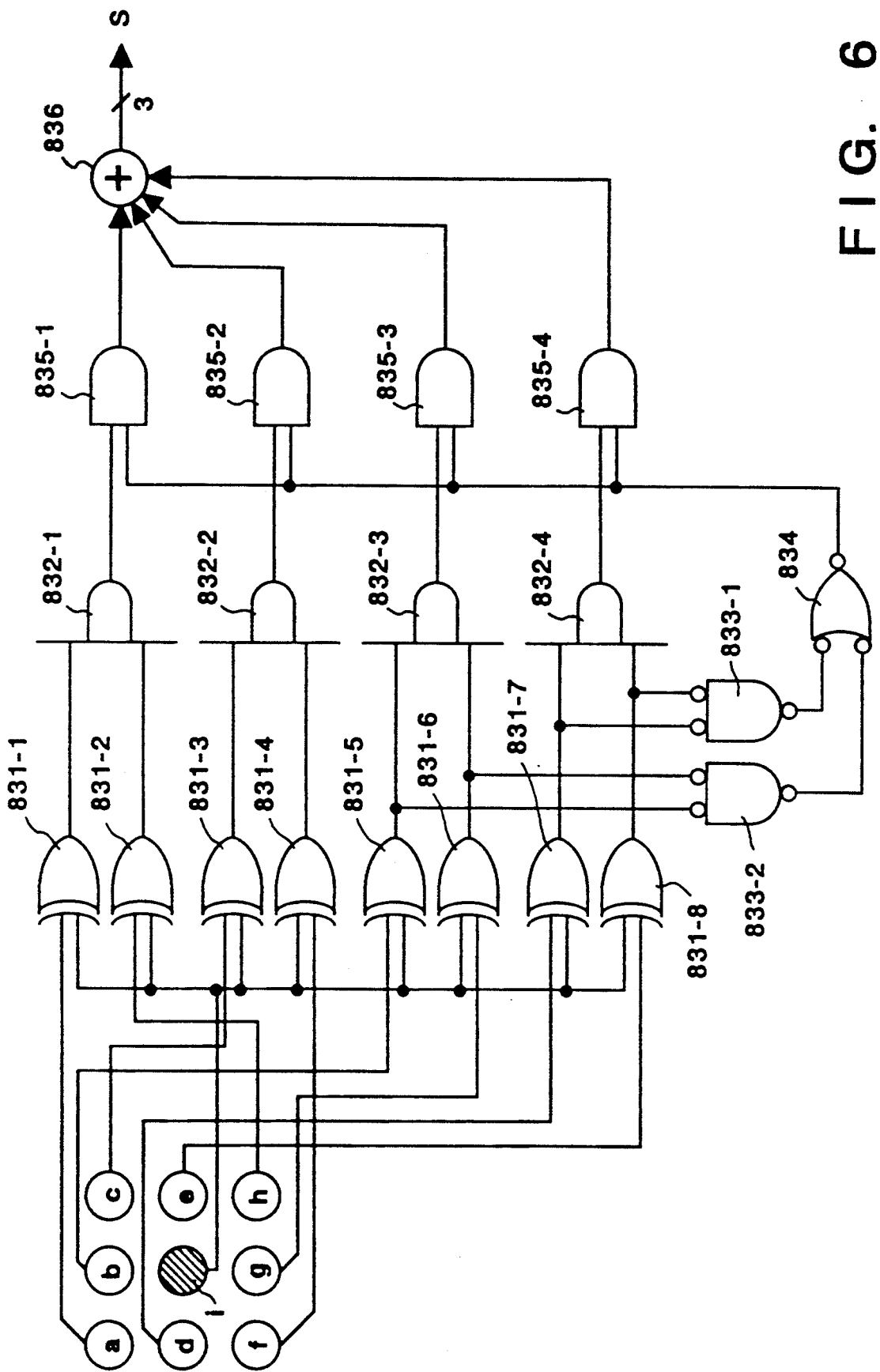
FIG. 6 is a circuit diagram showing gate circuits in FIG. 5.

As shown in FIG. 6, a, b, c, d, e, f, g and h neighboring a central pixel i are the output signals B from the memories 80-1 and 80-2 and from the F/Fs 81-1 through 81-5. Exclusive-OR (hereinafter referred to as "EX-OR") gates 831-1 and 831-2 detect whether the object pixel i has reversed in the a-i-h direction. In other words, when the outputs of the EX-OR gates 831-1 and 831-2 are both "1", the output of an AND gate 832-1 is "1". When the output of the AND gate 832-1 is "1", this means that the object pixel i is isolated in the a-i-h direction. Similarly, EX-OR gates 831-3, 831-4 and an AND gate 832-2; EX-OR gates 831-5, 831-6 and an AND gate 832-3; and EX-OR gates 831-7, 831-8 and an AND gate 832-4 decide whether the object pixel is isolated in the c-i-f, b-i-g and d-i-e directions, respectively.

AND gates 833-1, 833-2 and an OR gate 834 detect whether the object pixel remains at the same level "0" or "1" continuously in the b-i-g (vertical) direction or d-i-e (horizontal) direction. When the "0" or "1" level continues in the vertical or horizontal direction, the output of OR gate 834 becomes "0". This signal is supplied to the input terminal of each of AND gates 835-1 through 835-4. These AND gates take the AND between this input signal and the respective outputs of the aforementioned AND gates 832-1 through 832-4, and they output the result to an adder 836, which calculates the sum. Thus, the signal S indicative of the values of 0 through 4 is obtained.

The physical meaning of the conditions determined by the AND gates 833-1, 833-2 and OR gate 834 is that continuity in perpendicular directions is being investigated on the plane of the drawing (the surface of an original or recording paper). In other words, since generally there is a high possibility that a character or the like will be connected by perpendicular line segments, the aforementioned AND gates and OR gate are provided to prepare for this. Accordingly, when there is continuity in both the horizontal and vertical directions, S=0 holds and the characteristic quantity Pf is reduced. As for the value of Pf, it is preferred that the area over which addition is performed be large, i.e., on the order to a block of 7×7 pixels. More specifically, a larger area makes it possible to identify a character at a higher definition. It should be noted, however, that the block shape of this block size is not limited to the foregoing example but can be set appropriately in conformity with detection accuracy and the like.

Figure 7:
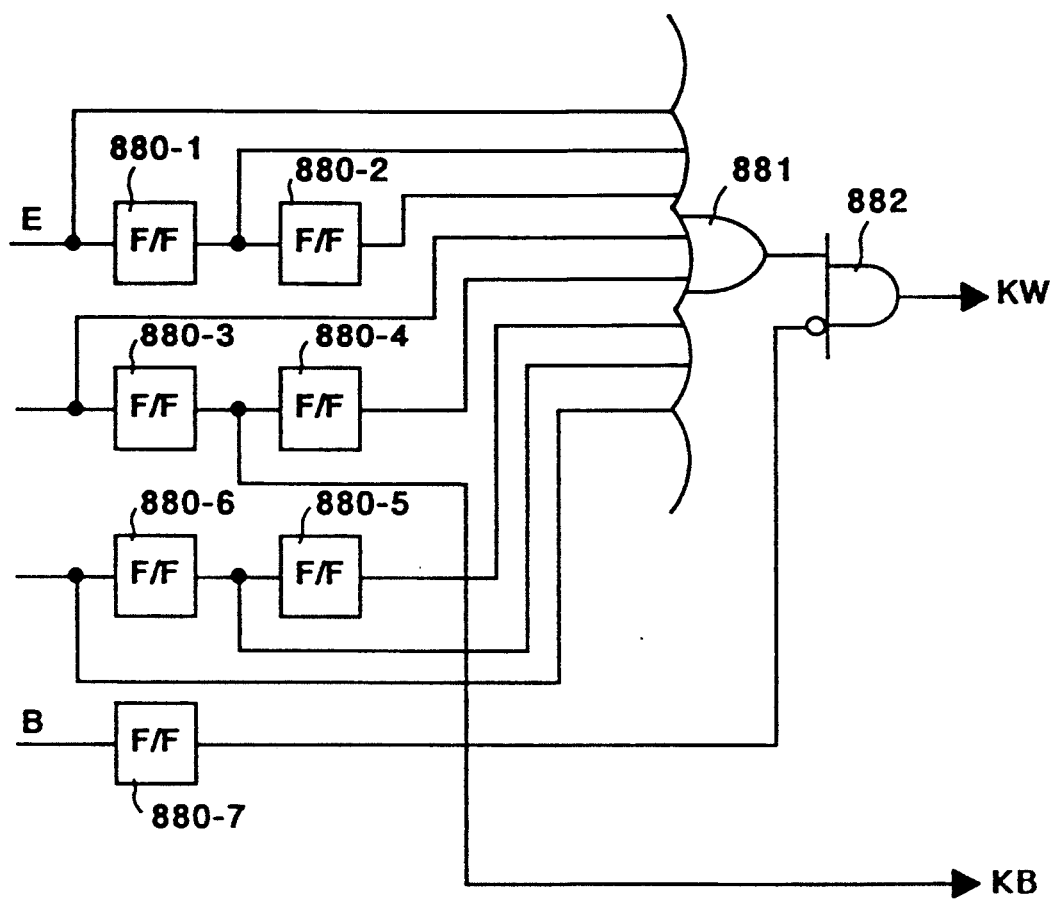
FIG. 7 is a block diagram showing a black-character signal generator in FIG. 6.

FIG. 7 is a block diagram illustrating the black-character signal generating unit 88 of FIG. 5. This will be described in detail.

Though already mentioned above, the purpose of the black-character signal generating unit 88 is to output signal KB=1 when the object pixel in on part of a black character or line; signal KW=1 when the object pixel is not on a black portion but is close to a black character or line (adjacent thereto according to this embodiment); and signal KB=KW=0 in all other cases.

The one-bit signals E and B enter the black-character signal generating unit 88, and the signal E is delayed one line and then by one pixel by each of F/Fs 880-1 through 880-5. If the position of the object pixel is assumed to be the output of the F/F 880-3, then an OR gate 881 will deliver a "1" output when any of the eight pixels neighboring the object pixel is E=1. Accordingly, the signal KW is obtained if the signal B enters an AND gate 882 upon changing state after it is delayed by an F/F 880-7 so as to be synchronized to the position of the object pixel.

This ends the description of the black-character detector 6 shown in FIG. 1.

Recording-Signal Controller 4

The recording-signal controller 4 shown in FIG. 1 will now be described.

The processing executed by the recording-signal controller 4 of this embodiment will be described first.

FIG. 8A illustrates the contents of a correction applied to the ternary signals C, M, Y inputted from the ternary converters 3-1 through 3-3. This is based upon the signals KB, KW outputted by the black-character detector 6 described above. FIG. 8B illustrates the contents of a correction applied to the ternary signal K from the ternary converter 3-4.

As shown in these drawings, when the logical level of the signal KB regarding the object pixel is "1", i.e., when the object pixel is part of a black character or line and is on the edge thereof, the recording control signal of the object pixel is controlled to a K-signal full dot (CKf=1) regardless of whether the recording control signal from each ternary converter is a full dot or a half dot. With regard to the C-, M- and Y-color dots at this time, recording of these color components is halted. The significance of this arrangement is that characters and lines can be recorded using full dots. Recording can be performed with assurance in the color black, and the recording can be made distinct.

When KW=1 holds, namely when the object pixel is not part of a black character or line but is in close proximity thereto, the recording color signals C, M, Y from the ternary converts are converted into half dots if they are full dots; if they are half dots, recording is halted. The purpose of processing when K=1 holds is to improve the clarity of a black character or line by reducing the density of each color portion in close proximity to the black character or line.

If the recording color signal from each ternary converter is "0" (no dot), C, M and Y become 0 (no dot) except when KB=1 holds. However, in a case where the judgment accuracy of the signal KB, which indicates that the object pixel is part of a black character, is not high, it is permissible to adopt an arrangement in which the recording color signals are made to indicate no dot even if KB=1 holds.

Figure 11:
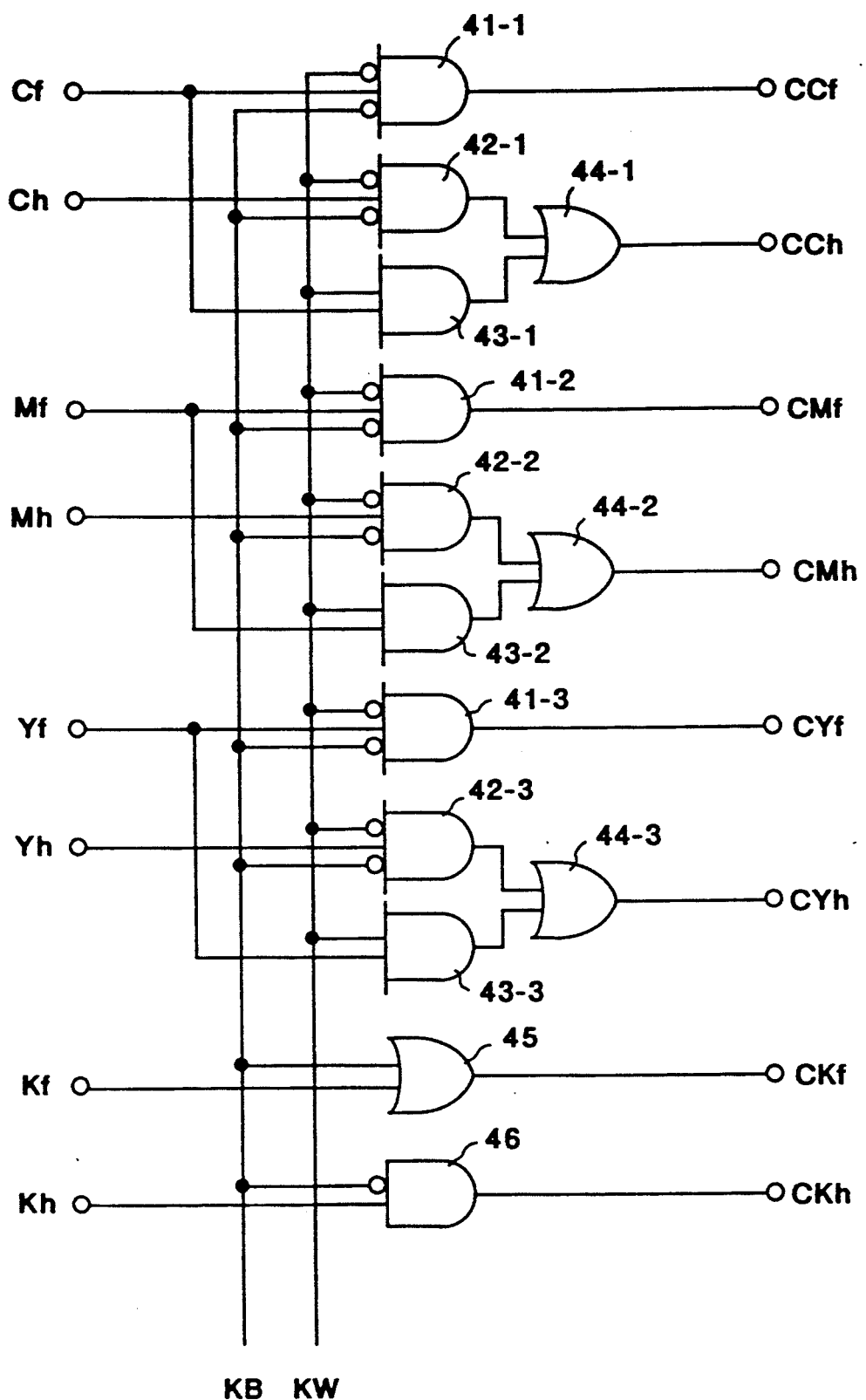
FIG. 11 is a circuit diagram showing the recording signal controller according to the first embodiment.

FIG. 11 is a detailed circuit diagram of the recording-signal controller 4 when it is adapted to realize the processing of FIGS. 8A, 8B described above.

As shown in FIG. 11, the signals Cf, Mf, Yf, Kf are bit signals indicative of full dots in the ternary data obtained from respective ones of the ternary converters 3-1 through 3-4. Signals Ch, Mh, Yh and Kh are bit signals indicative of half dots in the respective items of ternary data.

First, a case where KB=1, KW=0 holds (the condition KB=KW=1 is not possible, as described earlier) will be described. A black full dot, namely CKf, is outputted by an OR gate 45 irrespective of Kf, and gates 41-1, 41-2, 41-3 deliver "0" outputs (CCf=CMf=CYf=0). OR gates 44-1, 44-2, 44-3, which produce half-dot signals, all output "0".

In a case where KW=1, KB=0 holds, the signals indicative of black components Kf, Kh remain at their inputted levels and are outputted as CKf, CKh by AND gates 45,46, respectively. Further, at this time gates 41-1, 41-2, 41-3 are closed to signals Cf, Mf, Yf irrespective of their logic levels, and therefore the corresponding outputs CCf, CMf, CYf all become "0". However, since gates 43-1, 43-2, 43-3 corresponding to the signals Cf, Mf, Yf are open, the signals Cf, Mf, Yf are outputted as signals CCh, CMh, CYh, respectively. Since the gates 42-1, 42-2, 42-3 are closed, the signals Cf, Mf, Yf are not delivered as outputs.

When the condition KB=0, KW=0 holds, the gates 41-1, 41-2, 41-3 are open and therefore the signals Cf, Mf, Yf are outputted intact. Since the gates 42-1, 42-2, 42-3 are closed and gates 43-1, 43-2, 43-3 are open, the signals Ch, Mh, Yh are outputted directly as CCh, CMh, CYh, respectively.

Description of Recording Unit 5

The construction of the recording unit 5 of FIG. 1 will now be described.

Though the recording unit 5 of this embodiment is applicable to various recording methods such as thermal-transfer recording and electrostatic recording, an ink-jet printer will be taken as an example, as described earlier. Accordingly, a case in which the apparatus of the invention employs an ink-jet recording unit will be described below.

Figure 14:
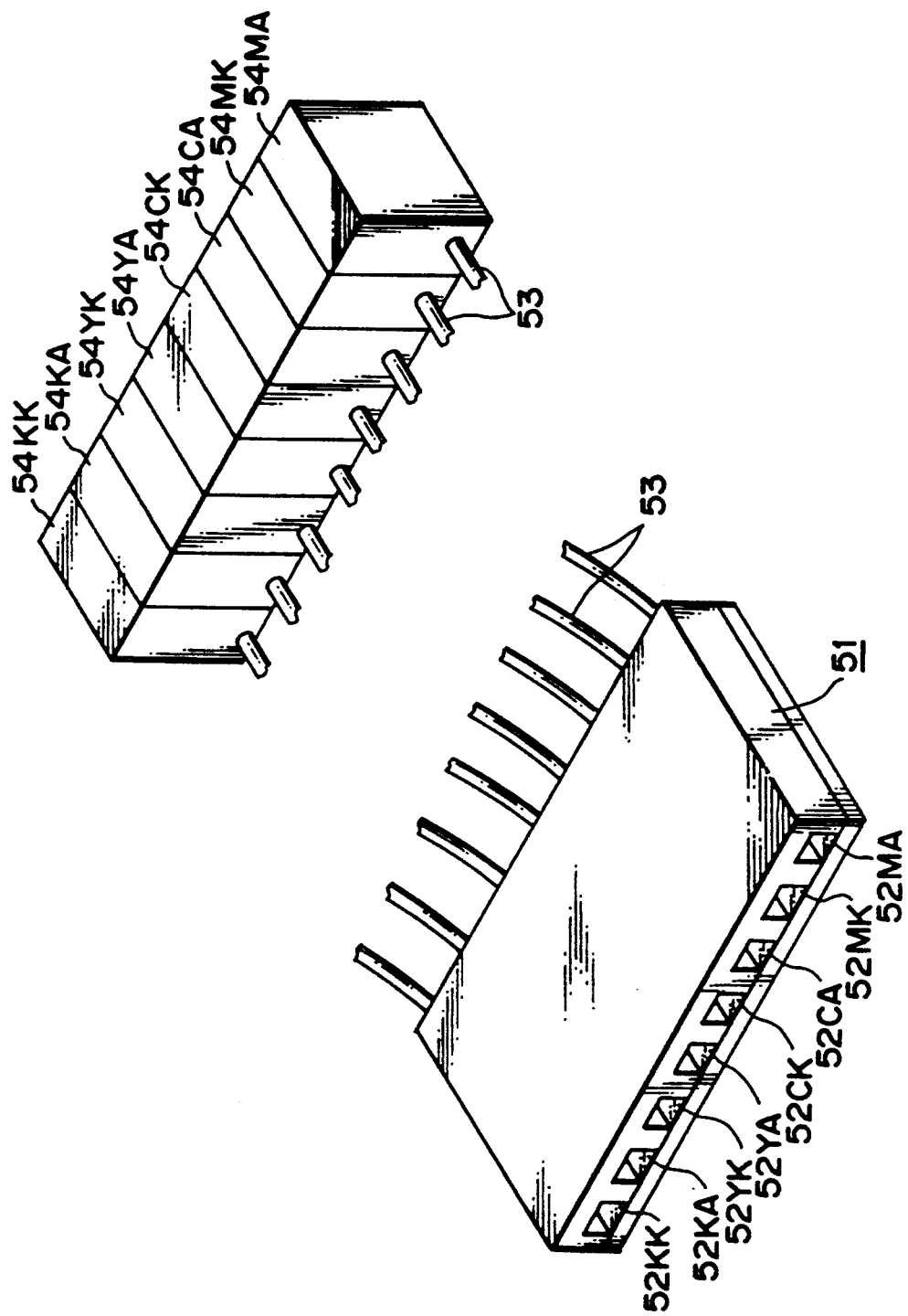
FIG. 14 is a diagram showing the relationship between a recording head and ink tank of a recording device in the embodiment.

FIG. 14 is a perspective view illustrating parts peripheral to the head of an ink-jet recording unit which employs heating elements.

Numeral 51 denotes a head unit having a total of eight nozzles 52. More specifically, the head unit 51 has a nozzle 52KK, which corresponds to the signal CKf, for discharging liquid droplets of dark black ink; a nozzle 52KA, which corresponds to the signal CKh, for discharging liquid droplets of light black ink; a nozzle 52YK, which corresponds to the signal CYf, for discharging dark yellow ink; a nozzle 52YK, which corresponds to the signal CYh, for discharging light yellow ink; a nozzle 52MK, which corresponds to the signal CMf, for discharging dark magenta ink; a nozzle 52MA, which corresponds to the signal CMh, for discharging light magenta ink; a nozzle 52CK, which corresponds to the signal CCf, for discharging dark cyan ink; and a nozzle 52CA, which corresponds to the signal CCh, for discharging light cyan ink.

Numeral 53 denotes an ink supply tube for supplying ink to a corresponding nozzle, and numerals 54KK, 54KA, 54YK, 54YA, 54CK, 54CA, 54MK, 54MA designate eight main tanks corresponding to the aforementioned nozzles.

Figure 15:
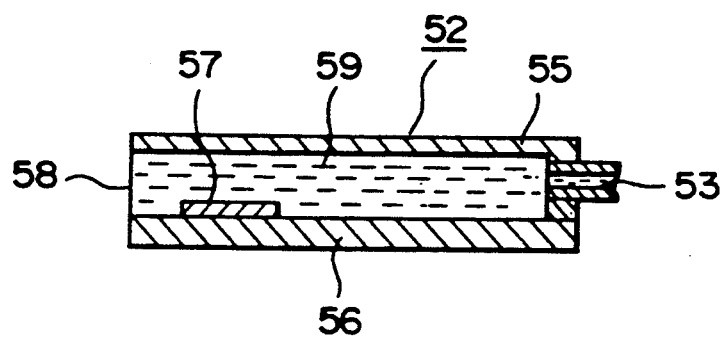
FIG. 15 is a diagram showing the cross-sectional structure of an ink-jet head according to the embodiment.

FIG. 15 shows the cross-sectional structure of one of the nozzles 52. The nozzle 52 has an upper plate 55, a bottom plate 56, a heating element 57 and an orifice 58. Ink is shown at numeral 59.

When a voltage is impressed upon the heating element 57, the temperature thereof rises sharply and an air bubble is formed about the periphery of the element. When the voltage is removed, the air bubble contracts. Owing to the action of such bubble formation and contraction, the ink in the vicinity of the orifice 58 is discharged from the orifice.

The recording head is of the so-called "bubble-jet type", in which a change in state such as that in film boiling or the like is produced in the ink by thermal energy to produce a bubble. The bubble is used to discharge ink from the discharge port (the nozzle) toward the recording medium so as to record a character, image or the like. The recording head is such that the size of the heating resistor (heater) provided in each nozzle is much smaller than the piezoelectric element used in conventional ink-jet recording, thus making it possible to group the nozzles closer together. As a result, a recorded image of high quality can be obtained, high speed can be realized and noise reduced.

Though only one head is provided for one type of coloring material, it is of course possible to provide a number of heads in the auxiliary scanning direction. In such case, a buffer memory should be provided to temporarily hold each recording signal produced, and recording should be started when storage of the control signals in the buffer memory has ended.

Figure 16:
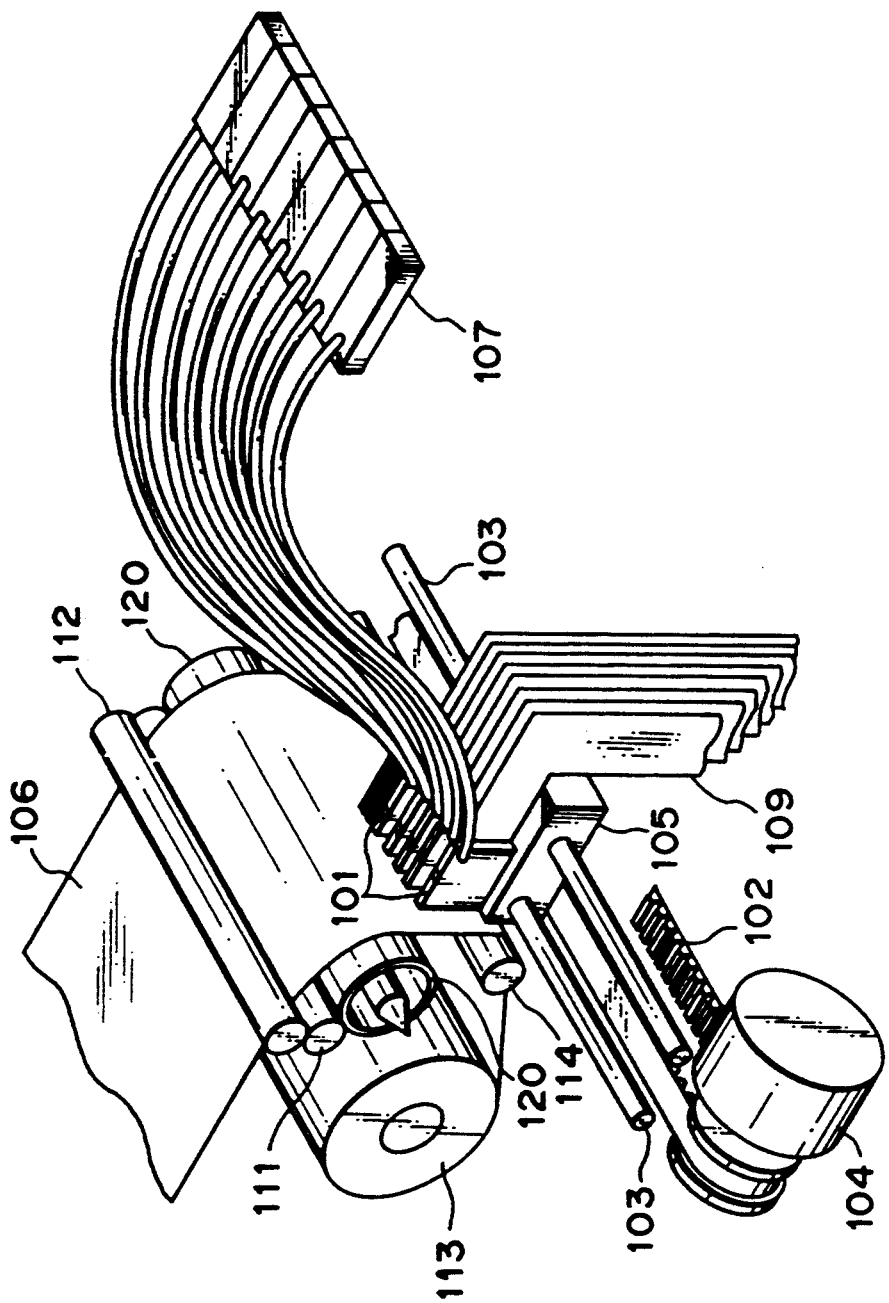
FIG. 16 is an external perspective view of principal components in the recording device of the embodiment.

As illustrated in FIG. 16, a head unit 101 has a number of ink-jet heads, which are arranged in the auxiliary scanning direction, for one type of colorant. The head unit 101 has a total of eight heads, namely heads for high- and low-density black, high- and low-density yellow, high- and low-density cyan and high- and low-density magenta. Numeral 107 denotes an ink tank for each head unit, and numeral 109 a signal line. Numeral 104 denotes a carriage drive motor which, in cooperation with a conveyor belt, causes a carriage 105 on which the head units are mounted to perform scanning motion along rails 103. Also shown in FIG. 16 are recording paper 106, a platen 120, paper conveying rollers 111, 112, a roll 113 of the recording paper, and a guide roller 114.

Though each head unit 101 comprises a plurality of ink-jet heads utilizing heating elements, as shown in FIG. 15, it is of course permissible to use ink-jet heads that employ electromechanical converting means such a piezoelectric elements.

In this embodiment, recording is performed using either dark ink or light ink. However, an arrangement can be adopted in which both light and dark inks are used to make possible four-valued processing. In other words, using dark ink, light ink, both dark and light ink, and using neither ink make it possible to effect four-valued processing. Further, inks whose densities have m stages can be prepared to make possible m-valued processing.

In this embodiment, full dots are made to correspond to dark ink, and half dots are made to correspond to light ink. However, if the recording elements are such that dot size can be modulated, the size of dot diameter can be made to correspond to the particular ink density. In this case, dot size can be varied in m stages to make m-valued processing possible. This will be described hereafter.

Thus, in accordance with the embodiment described above, when an object pixel is situated on the end portion of a black character of line, the C, M, Y inks are not used unconditionally; rather, recording is performed using black full dots only. When the object pixel is not on a black character or line but is situated in close proximity to a black character or line, recording is performed in such a manner that density is reduced with regard to the C, M, Y color components.

Description of Other Example of Black-Signal Generator

FIG. 3C is a block diagram illustrating another example of the black-signal generator 31 within the black-character detector 6. In the black-signal generator 31 of FIG. 3A, the chromaticity suppressing constant is the fixed value $\alpha$ regardless of the gray component max(R,G,B). However, since there is a great deal of chromaticity the larger the gray component, namely the brighter the gray component, the degree of chromaticity suppression should be increased the greater the degree of brightness. Accordingly, in order to realize this, the arrangement of FIG. 3C is such that a black signal d of high contrast is produced in accordance with the following equation:

$$d = \max(R,G,B) + \frac{\max(R,G,B)}{\beta} \{\max(R,G,B) - \min(R,G,B)\}$$

A multiplier 661 multiplies the value of max(R,G,B) −min(R,G,B) obtained from subtracter 63 by the output max(R,G,B) of the maximum-value detector 61, and the resulting product is divided by the constant $\beta$ in a divider 662. The value of constant $\beta$ should be on the order of 128. Further, the product outputted by the divider 662 is applied to the adder 64, where it is added to max(R,G,B). The limiter 65 limits the output of adder 64 to a maximum of "255".

Further, in FIG. 3C, the degree of chromaticity is defined as the difference between max (R,G,B) and min (R,G,B), and suppression thereof is performed by the adding operation. However, the degree of chromaticity can be defined as the ratio of max (R,G,B) to min (R,G,B), and suppression can be performed by applying multiplication to max(R,G,B). In other words, $$d = \max(R,G,B) \times \frac{\max(R,G,B)}{\min(R,G,B) + \gamma}$$

FIG. 3D is a block diagram showing an example of the black-signal generator 31 that is capable of realizing this.

Here the constant $\gamma$ should be on the order of "63". In accordance with the equation given above, the larger the gray component, i.e., the greater the brightness, the greater the effectiveness of chromaticity suppression. In a case where max (R,G,B) and min (R,G,B) are both small, the degree of suppression is reduced depending upon the constant $\gamma$. Accordingly, even if the black component takes on some chromaticity, the value of the black signal d does not become large and it is possible for the black signal to be produced with a higher contrast.

In FIG. 3D, an adder 663 adds the constant $\gamma$ to the output value of the minimum-value detector 62, and a divider 664 divides the output of the maximum-value detector 61 by the sum from the adder 663. Thereafter, a multiplier 665 multiplies max(R,G,B) by the output of divider 664.

The algorithm for suppressing the chromaticity from the R, G and B data and generating the black signal d indicative of the degree of blackishness is not limited to the arrangement of FIG. 3A described earlier. In addition, though R, G, B are used as the signals in black-signal generation, it goes without saying that the same effects can be obtained even if color-component signals other than Y, M, C are used as the recording colors.

Description of the Second Embodiment

Figure 2B:
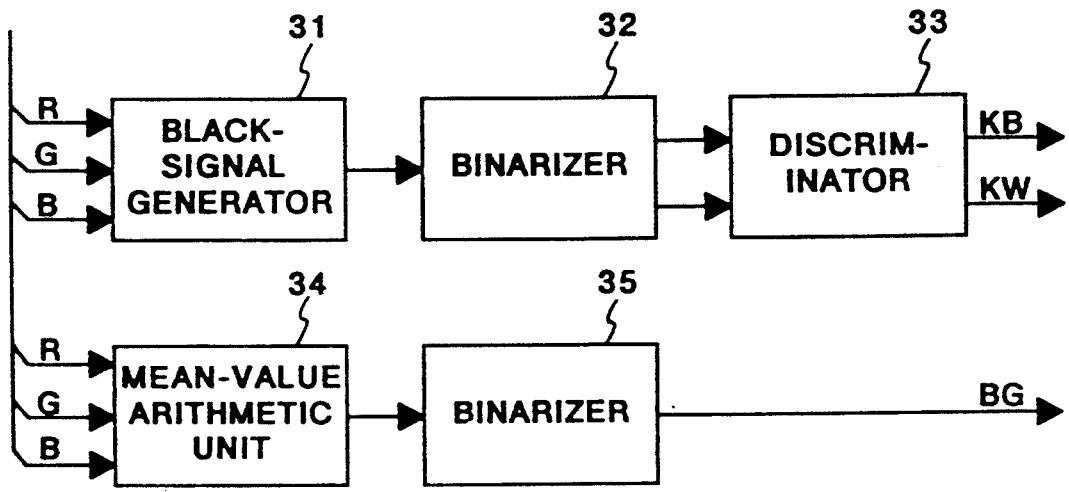
FIG. 2B is a block diagram showing another example of a black-character detector in the apparatus of the first embodiment.
Figure 12:
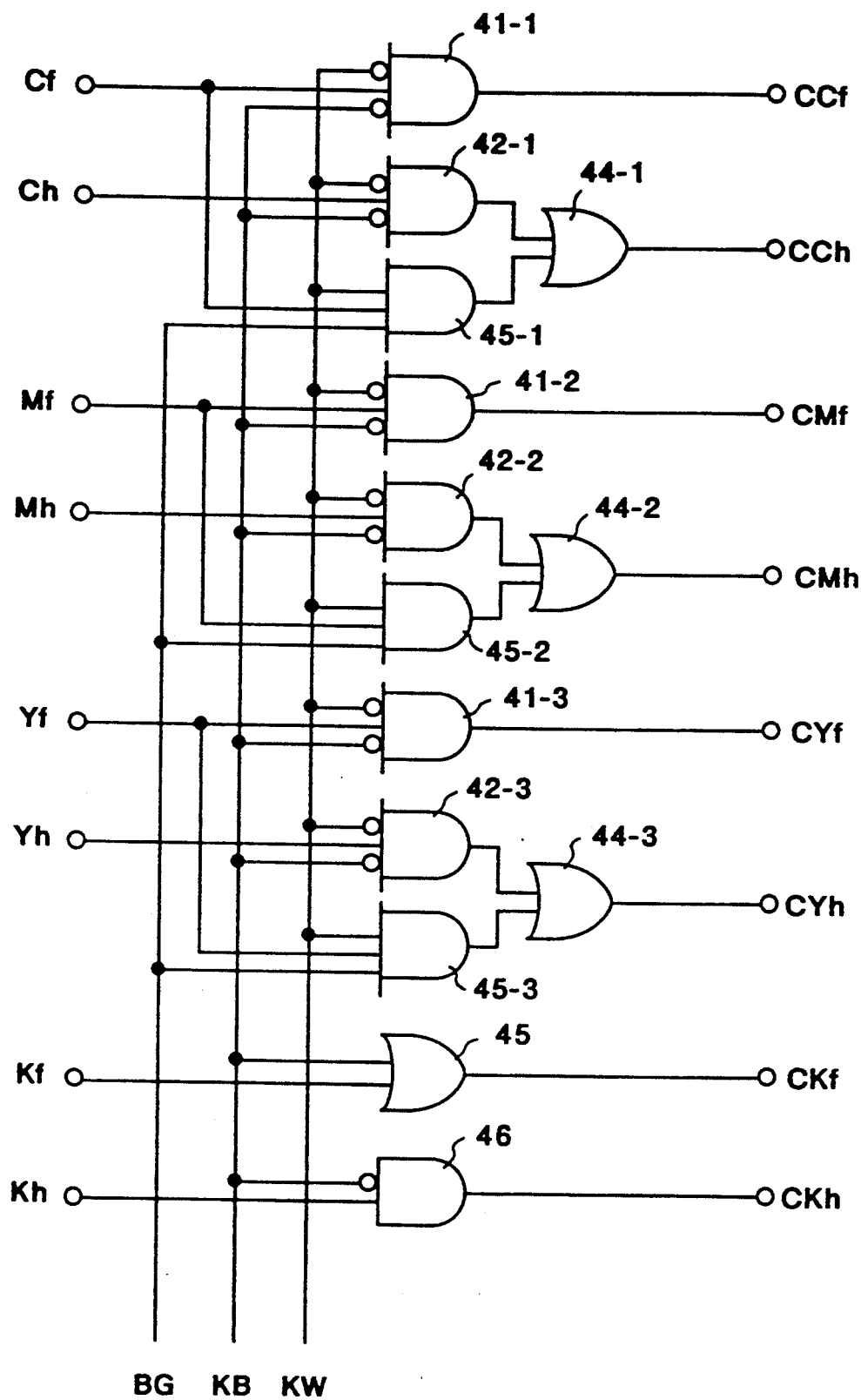
FIG. 12 is a circuit diagram showing the recording signal controller according to the second embodiment.

FIG. 2B is a block diagram illustrating the black-character detector 6 according to the second embodiment. FIG. 12 is a circuit diagram illustrating the recording-signal controller 4 according to the second embodiment.

In addition to the components of the first embodiment, the second embodiment is newly provided with a mean-value arithmetic unit 34 for calculating a mean value BGm of luminance in a prescribed area from input signals R, G, B, and a binarizer 35 for binarizing the mean value BGm, as shown in FIG. 2B. The recording-signal controller 4 of FIG. 12 uses binary signal BGm, which indicates the background density level, as well as the black-character detection signals KB, KW, to control the ternary recording signal outputted by each ternary converter and generate ternary recording signals actually recorded.

The mean-value arithmetic unit 34 outputs the results of computation given by the following equation:

$$BGm = \frac{1}{36} \sum_{-6}^{6} \sum_{-6}^{6} \frac{R+G+B}{3}$$

The mean value BGm is calculated whenever new pixel data RGB enters. This value is the mean value of the sum of the color components in a (6×6)-pixel area the center of which is the object pixel. This value represents the density of the background where the object pixel is located.

The binarizer 35 generates a decision signal BG in accordance with the following standard and outputs the signal:

BG=1 (the background has an image) when BGm<A holds;

BG=0 (white background) when BGm≦A holds.

The operation of the recording-signal controller 4 of FIG. 12 in accordance with the second embodiment will now be described with reference to FIGS. 9A and 9B.

According to the second embodiment, the object pixel is located on a colored image if KW=1 holds when BG=1 is in effect. When the object pixel is in close proximity to a black character or line, full dots among the C, M, Y color dots are converted into half dots and recording is suspended in case of half dots, just as in FIGS. 8A and 8B.

However, in a case where BG=0, namely in a case where the object pixel is on a white area and located in close proximity to a black character or line, all of the C, M, Y color dots are controlled so as to suspend recording even if KW=1 holds.

Accordingly, in comparison with the first embodiment, color dots on a colored background and in close proximity to a black character or line are completely suppressed, to make recording possible.

In order to realize this, the recording-signal controller 4 according to the second embodiment has the circuit arrangement shown in FIG. 12. This circuitry differs from that of FIG. 11 in that the AND gates 43-1, 43-2, 43-3 of FIG. 11 are replaced by AND gates 45-1, 45-2, 45-3, to which the BG signal is supplied.

Description of the Third Embodiment

According to the first and second embodiments, the ternary signals to be recorded are controlled by the one-bit signals KB, KW. In the third embodiment, KB is expressed by a ternary value of (KB1, KB2), and KW is expressed by a ternary value of (KW1, KW2). As a result, more accurate control is realized.

Figure 2C:
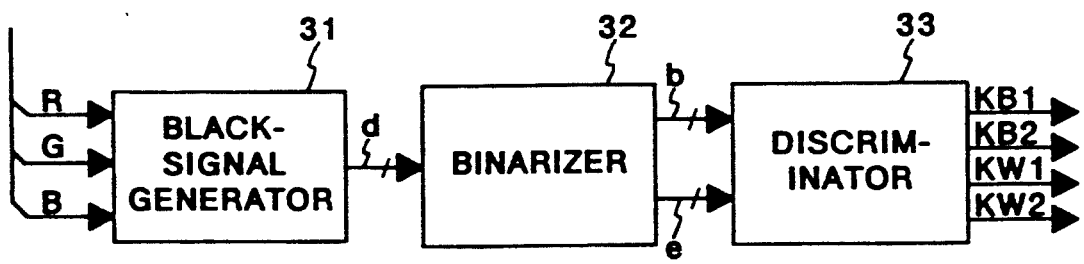
FIG. 2C is a block diagram showing still another example of black-character detector in the apparatus of the first embodiment.

FIG. 2C is a block diagram showing the black-character detector 6 according to the third embodiment, and FIG. 13 is a block diagram showing the recording-signal controller according to the third embodiment.

The difference between the black-character detector 6 of the third embodiment and that of the first embodiment resides in the discriminator 33. Specifically, the Pf value obtained by the adder 85-2 in the discriminator 33 of the first embodiment shown in FIG. 5 is converted into a ternary value to produce KB1, KB2. In other words, operation is as follows:

KB1=1, KB2=0 when 0≦Pf<K1 holds;

KB1=0, KB2=1 when K1≦Pf<K2 holds; and

KB1=0, KB2=0 when K2≦Pf holds.

In the foregoing, it is assumed that K1=8, K2=14 hold.

In case of KB1=1, it is determined that the object pixel is completely off a screen image. In case of KB1=0, KB2=0, it is determined that the object pixel is in a screen image of pixels which form a shaded area. In a case of KB2=1, it is determined that the object pixel is situated on a gray character or on the edge of a gray character in this intermediate state.

Accordingly, control of the recording signals C, M, Y, K based on the signals KB1, KB2 and the signals KW1, KW2 adjacent these is as shown in FIGS. 10A through 10D.

As is evident from FIG. 10A, recording in the colors C, M, Y is suspended, irrespective of the values of the recording color signals C, M, Y, when KW1=1 holds, namely when the position of the object pixel is not on part of a black character or line but a black character or line resides close to this pixel with certainty. Further, as shown in FIG. 10B, in a case where an F-dot (full-dot) signal is present on the recording color component at the position of the object pixel when KW2=1, KW1=1 hold, the F dot is converted into an H dot (half dot). When the H dot is present, recording thereof is suspended.

Control based upon KB1 and KW1 in FIG. 10C is the same as in FIG. 8B in the first embodiment and FIG. 9B in the second embodiment. Control of KB2, KW2 becomes as shown in FIG. 10D. More specifically, when KB2=1 holds, recording is performed with an H dot irrespective of the ternary state of the K signal. Accordingly, with regard to the object pixel when KB2=1, KW2=1 hold, recording with a half dot of the black signal becomes possible without disturbing the background image in a case where the character is in an image. Further, recording with a half dot of the black signal becomes possible up to more slender portions in comparison with the second embodiment in a case where the character in on white background. As a result, higher quality recording is possible. An example of a circuit for performing the control shown in FIGS. 10A through 10D is as illustrated in FIG. 13.

Description of the Fourth Embodiment

The recording unit 5 in each of the foregoing embodiments has two heads, namely a dark-ink head and a light ink head, for each of the color components C, M, Y and K (for a total of eight recording heads). In addition, the number of types of ink is the same as the number of heads. However, the present invention is not limited to such an arrangement.

In the fourth embodiment, an example is described in which shading can be reproduced using a single head.

In principle, the number of ink droplets discharged from a head is controlled to reproduce shading. The amount of ink involved when one ink droplet is discharged at the same location differs from that when two ink droplets are discharged. Naturally, the larger the number of discharges, the wider the spread of the ink and the larger the dot diameter. This embodiment attempts to utilize this phenomenon. Stated more simply, dots are printed in overlapping fashion.

Figure 17:
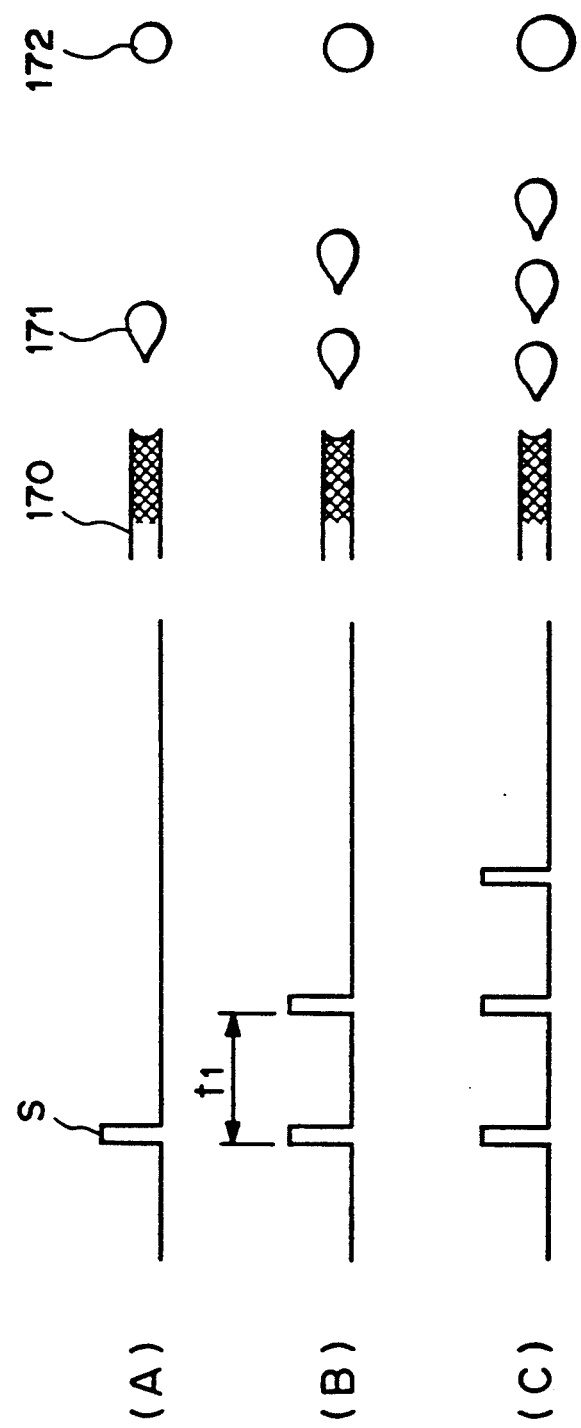
FIGS. 17a-c is a diagram for describing the principle of superimposed dot printing according to a fourth embodiment of the present invention.

As shown in FIGS. 17(A) through (C), when the discharge signal S of the ink-jet printer is applied continuously to a heating element within nozzle 170, the nozzle discharges ink droplets 172 the number of which corresponds to the number of pulses in the discharge signal S. As a result, these ink droplets attach themselves to the same position on the recording paper. Accordingly, the ink solutions spread on the recording paper and the dot diameter enlarges while the inks mix with one another. As the dot diameter grows, the density of the printed dot itself, indicated at numeral 172, rises owing to the overlapping of the inks, and it is possible to reproduce tones by both area and actual density. However, it is necessary to place a limit upon the number of pulses. The reason for this is that there is a limit upon the amount of liquid the recording paper can absorb. If the amount of ink is too large, drying will be delayed and adjacent dots of ink may run together in some cases. Good results cannot be obtained when this occurs.

An example in which the number of ink droplets superimposed is made zero to three will be described below.

Figure 18:
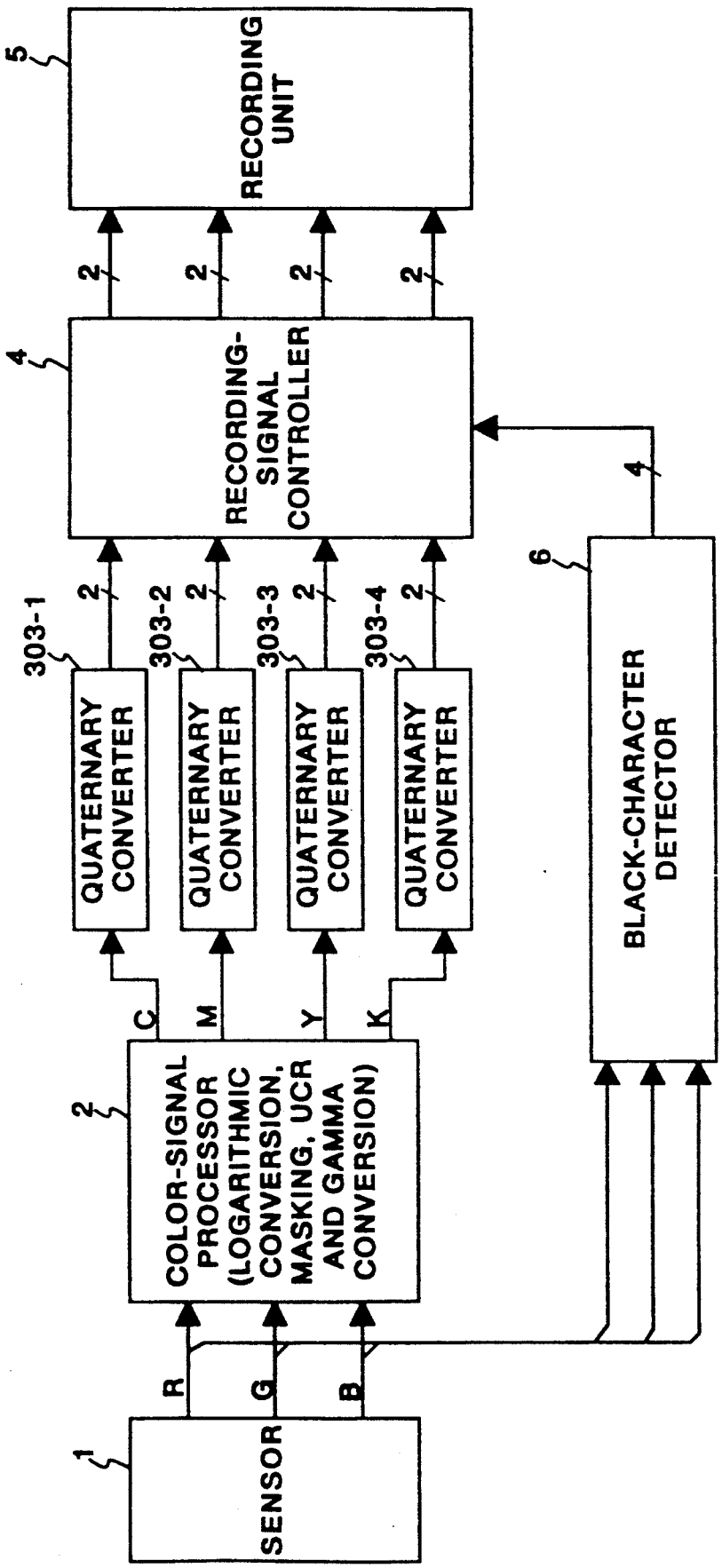
FIG. 18 is a block diagram illustrating the fourth embodiment of the image processing apparatus according to the present invention.

FIG. 18 is a block diagram showing the apparatus of the fourth embodiment. The basic construction is almost the same as that of FIG. 1. According to the fourth embodiment, the black-character detector 6 of the third embodiment is employed, and the signals KB1, KB2, KW1, KW2 are used as the detected results. Quaternary converters 303-1 through 303-4 are provided instead of the ternary converters 3-1 through 3-4. Two-bit pixel data of each of the quaternary-converted colors Y, M, C, K is operated upon in the recording-signal controller 4 in dependence upon the four-bit output signal from the black-character detector 6.

The operation of the recording-signal controller 4 will now be described with reference to FIG. 19.

In accordance with the fourth embodiment, a four-valued tone image can be recorded using one recording head for each of the colors Y, M, C and K. Moreover, since this can be realized by one recording head for each color component, the apparatus can be simplified and cost can be reduced.

The meaning of FIGS. 19A through 19D is as follows:

When KB=1 holds, namely when the object pixel clearly is on part of a black character or line, the recording-control signal of each of the color components C, M, Y is "0" regardless of what the four-valued data is. In other words, the C-, M-, Y-ink droplets are not discharged, and ink-discharge signals are outputted the maximum (=3) number of times with regard to the head for black ink.

When KW1=1 holds, namely when the object pixel clearly is not on a black portion and is in close proximity to a black character or line, the discharge signals for the ink droplets corresponding to C, M and Y are not produced. Discharge signals, the number of which corresponds to the four-valued K-component data, are outputted.

When KB2=1 holds, the C-, M- and Y-components are moderated and the maximum number of ink-discharge signals are produced for the K component.

When KW2=1 holds, the C, M and Y components are moderated and discharge signals, the number of which corresponds to the four-valued K-component data, are outputted for the K component.

In the fourth embodiment described above, dot diameter and the density of the dot itself are changed, so as to express tones, by changing the number of times ink droplets are discharged. However, it is possible also to change dot density without altering dot diameter.

Figure 20:
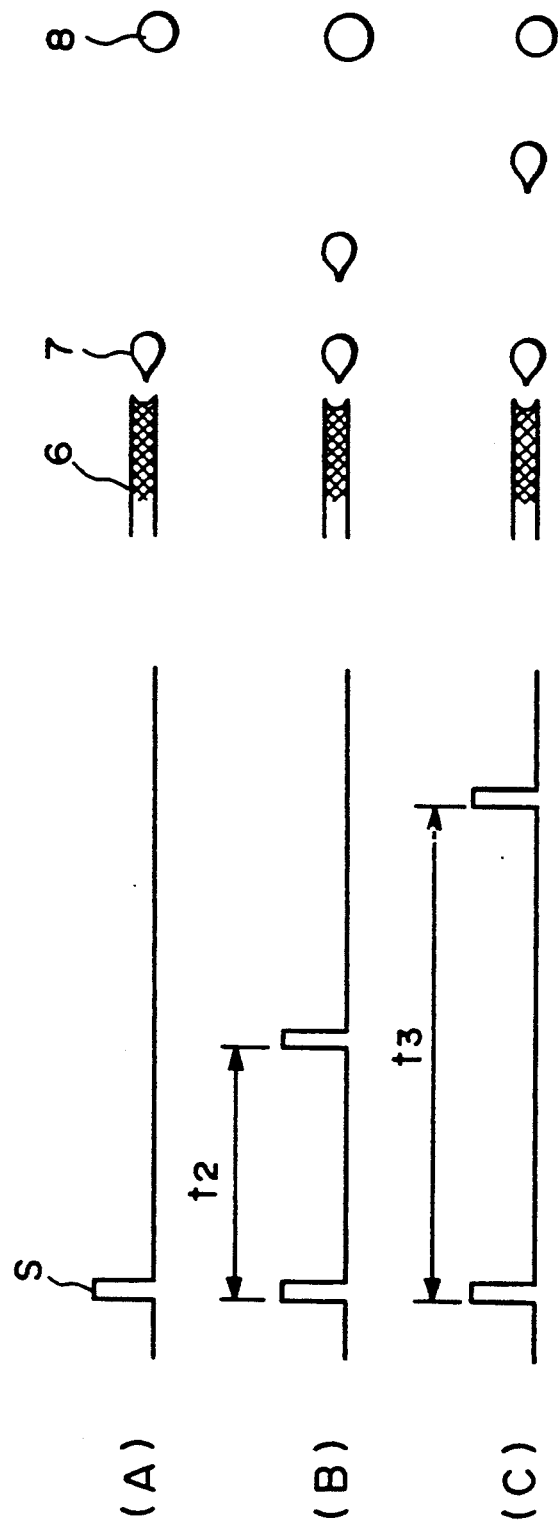
FIGS. 20a-c is a diagram for describing a principle through which dot diameter is not substantially changed by controlling ink-discharge interval according to the fourth embodiment.

FIGS. 20(A) through (C) illustrate the dot-diameter relationship when the interval from discharge of the first ink droplet to discharge of the second ink droplet differs. Specifically, FIG. 20 shows that when the discharge interval is lengthened, dot density increases. In addition, since the second droplet discharge takes place after the ink droplet discharged first has had enough time to sink in, dot growth due to discharge of the second ink droplet is rapid. As a result, it is possible to form a dot having multiple densities while reducing the degree of dot-diameter growth. If interval t3 in which the growth of dot diameter is reduced is adequate, no problems are encountered. However, this will reduce traveling speed of the carriage and slow down recording speed. Accordingly, though the interval 3t preferably is as short as possible, the interval is decided depending upon the environment (temperature and humidity) in which the apparatus is installed, the recording paper material and the composition of the ink solution, and should be corrected appropriately in conformity with these factors.

In the first through fourth embodiments set forth above, examples are described in which the apparatus performs three- or four-valued pseudo-half-tone processing. However, the present invention is not limited to these arrangements and can be applied to two-valued pseudo-half-tone processing or pseudo-half-tone processing based on five or more values.

Further, the processing of the present invention is applicable also to a mean-density preservation method in addition to the error-diffusion method and dither method, and results similar to those of the foregoing embodiments can be obtained.

The construction of the black-character detector is not limited to that of the present invention. For example, a Laplacian can be treated as a threshold value, and a Pf value and KB, KW signals similar to those of the foregoing embodiments can be obtained from this array.

Further, the multivalued recording means of the recording unit 5 in the present invention is not limited to an ink-jet recording unit which discharges ink having the foregoing shades and reproduces shades by a number of ink-discharge operations. The invention is applicable also to laser printers and printers which use a shade reproduction method typified by pulse-width modulation in thermal recording.

In addition, printers capable of color recording, such as color ink-jet printers, color thermal-transfer printers, color-dot printers and color laser-beam printers, can be used as the printer for outputting the recording signals produced in the manner described above.

The present invention is particularly effective when applied to a printer using a head of the type which discharges ink droplets by utilizing film boiling produced by thermal energy, as disclosed in U.S. Pat. No. 4,723,129 and U.S. Pat. No. 4,740,793.

The arithmetic circuits described above can be realized by computer software capable of performing the aforementioned arithmetic operations using a ROM, a RAM, etc.

Further, the image data can be entered not only by a CCD line sensor but also from a host computer via an interface, or from an external storage device (e.g., a floppy disk).

Further, slender black lines are not the only slender lines that can be identified. For example, slender lines in the color red or blue can be discriminated by preparing red and blue as the recording colors.

In accordance with the above-described embodiments, the invention has the following effects applied to the recording of color signals, which have a small number of bits, obtained from inputted color-component signals:

1. The black-character portions and fine black line portions of an original image can be recorded and expressed in blacker color and with higher definition.

2. The foregoing effect can be obtained without disturbing the image in the proximity of a gray edge in an ordinary image.

ADVANTAGES OF THE INVENTION

In accordance with a first aspect of the present invention as described above, excellent images can be produced in which characters and lines of a prescribed color are made to stand out from a neighboring image, and in which the characters and lines of the prescribed color will not undergo color displacement.

In accordance with a second aspect of the present invention as described above, characters and lines of a prescribed color are made relatively conspicuous without reducing the density of an image portion neighboring the character or line.

In accordance with a third aspect of the present invention as described above, excellent images are produced in which characters and lines of a prescribed color are made to stand out from both their inner and outer sides, and in which the characters and lines of the prescribed color do not undergo color displacement.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:
   input means for inputting image data consisting of a plurality of color components expressed by n-levels (n>2) of values;
   converting means for converting the color components of n-level of values to m-level (2<m<n) of values;
   discriminating means for determining whether an object pixel is on part of a line of a predetermined color based upon the image data inputted by said input means; and
   correcting means for correcting color components of m-level of values of the object pixel based upon the determination made by said discriminating means.

2. The apparatus according to claim 1, wherein said correcting means emphasizes only a color component, of an output color of the object pixel, which represents the predetermined color, when it is determined that said object pixel is situated on part of the line of the predetermined color.

3. The apparatus according to claim 1, wherein said correcting means corrects the output color of the object pixel in such a manner that only one color representing the predetermined color is used and the density thereof is maximized when said discriminating means has determined that the object pixel resides on part of a line of the predetermined color.

4. The apparatus according to claim 1, wherein the predetermined color is black.

5. The apparatus according to claim 4, wherein said discriminating means comprises extracting means for extracting a degree of the color black of the object pixel by calculating the difference between a maximum component and a minimum component of each color component of the inputted object pixel and adding the difference to the maximum component.

6. The apparatus according to claim 1, further comprising recording means for recording an image using data representing the output color of the object pixel processed by said correcting means.

7. The apparatus according to claim 6, wherein said recording means comprises an ink-jet printer for recording an image using ink having m-levels of density for each color component;

said correcting means performing recording using only one ink of maximum density, which represents the predetermined color, as the output color of the object pixel when said discriminating means has determined that the object pixel resides on part of a line of the predetermined color.

8. The apparatus according to claim 6, wherein said recording means comprises an ink-jet printer for recording a tone image using ink for each color component and controlling the number of times the ink is discharged at the same position;

said correcting means performing recording by discharging one color ink, which represents the predetermined color, a plurality of times as the output color of the object pixel when said discriminating means has determined that the object pixel resides on part of a line of the predetermined color.

9. The apparatus according to claim 6, wherein said recording means includes a recording head which discharges ink droplets by utilizing film boiling produced by thermal energy.

10. The apparatus according to claim 1, wherein said discriminating means comprises:

memory means for storing and preserving a degree of the predetermined color, extracted by said extracting means, in close proximity to a position of the object pixel;

first binarizing means for generating a binary signal based upon information stored in said memory means, said binary signal representing whether the degree of the predetermined color at the position of the object pixel is higher than that at the position of a pixel nearby; and second binarizing means for generating a binary signal which represents whether a change in the predetermined color is larger than a predetermined value at the position of the object pixel stored by said memory means.

11. The apparatus according to claim 10, wherein said discriminating means further comprises:

third binarizing means for outputting a binary signal, based upon the binary signal generated by said first binarizing means, which represents whether pixels having a high degree of the predetermined color in close proximity to the position of the object pixel are scattered in a discontinuous state;

wherein the position of said object pixel being determined to reside on part of a line of the predetermined color when (a) the degree of predetermined color of the object pixel is high and (b) pixels, which are in close proximity to the object pixel, having a high degree of the predetermined color are determined to exist in a continuous state.

12. An image processing apparatus comprising:

input means for inputting image data consisting of a plurality of color components expressed by n-levels (n $\geq$ 2) of values;

extracting means for extracting a degree of a predetermined color of inputted data indicative of an object pixel;

discriminating means for determining, based upon the degree of the predetermined color extracted by said extracting means, whether the object pixel is not on part of a line of the predetermined color but is situated at a position in close proximity to the line of the predetermined color; and correcting means for correcting each color component of an output color of the object pixel based upon the determination made by said discriminating means.

13. The apparatus according to claim 12, wherein said correcting means lowers the value of each color component of the output color of the object pixel when it is determined that said object pixel is not on part of a line of the predetermined color but is situated at a position in close proximity to the line of the predetermined color.

14. The apparatus according to claim 12, wherein said correcting means corrects the output color of the object pixel in such a manner that only one color representing the predetermined color is used when said discriminating means has determined that the object pixel resides on part of a line of the predetermined color.

15. The apparatus according to claim 12, wherein the predetermined color is black.

16. The apparatus according to claim 15, wherein said extracting means calculates the degree of the color black of the object pixel by calculating the difference between a maximum component and a minimum component of each color component of the inputted object pixel and adding the difference to the maximum component.

17. The apparatus according to claim 12, wherein said discriminating means comprises:

memory means for storing and preserving the degree of the predetermined color, extracted by said extracting means, in close proximity to the position of the object pixel;

first binarizing means for generating a binary signal based upon information stored in said memory means, said binary signal representing whether the degree of the predetermined color at the position of the object pixel is higher than that at the position of a pixel nearby; and second binarizing means for generating a binary signal which represents whether a change in the predetermined color is larger than a predetermined value at the position of the object pixel stored by said memory means.

18. The apparatus according to claim 17, wherein said discriminating means further comprises:

third binarizing means for outputting a binary signal, based upon the binary signal generated by said first binarizing means, which represents whether pixels having a high degree of the predetermined color in close proximity to the position of the object pixel are scattered in a discontinuous state;

wherein the object pixel being determined to reside not on part of a line of predetermined color but at a position in close proximity to the line of the predetermined color when (a) the degree of the predetermined color of the object pixel is low and (b) pixels, which are in close proximity to the object pixel, having a high degree of the predetermined color are determined to exist in a continuous state.

19. The apparatus according to claim 12, further comprising recording means for recording an image using data representing the output color of the object pixel processed by said correcting means.

20. The apparatus according to claim 19, wherein said recording means comprises an ink-jet printer for recording an image using ink having m-levels of density for each color component;

said correcting means performing recording using ink of a density lower than that of an ink having a given density with regard to color components other than at least the color components of the predetermined color of the object pixel when said discriminating means has determined that the object pixel resides not on part of a line of the predetermined color but at a position in close proximity to the line of the predetermined color.

21. The apparatus according to claim 19, wherein said recording means comprises an ink-jet printer for recording a tone image using ink for each color component and controlling the number of times ink is discharged at the same position;

said correcting means performing recording by discharging ink a number of times less than a given number of times with regard to color components other than the color components of the predetermined color of the object pixel when said discriminating means has determined that the object pixel resides not on part of a line of the predetermined color but at a position in close proximity to the line of the predetermined color.

22. The apparatus according to claim 19, wherein said recording means includes a recording head which discharges ink droplets by utilizing film boiling produced by thermal energy.

23. An image processing apparatus comprising:

input means for inputting image data consisting of a plurality of color components expressed by n-levels (n≧2) of values;

extracting means for extracting a degree of a predetermined color of inputted data indicative of an object pixel;

discriminating means for determining, based upon the degree of the predetermined color extracted by said extracting means, whether the object pixel resides (a) on part of a line of the predetermined color, (b) not on part of a line of the predetermined color but at a position in close proximity to the line of the predetermined color, or (c) neither on part of nor in close proximity to the line of the predetermined color; and correcting means for correcting each color component of an output color of the object pixel based upon the determination made by said discriminating means.

24. The apparatus according to claim 23, wherein said correcting means emphasizes only a color component, of the output color of the object pixel, which represents the predetermined color, when it is determined that said object pixel is situated on part of the line of the predetermined color, and lowers the value of each color component of the output color of the object pixel when it is determined that said object pixel is not on part of a line of the predetermined color but is situated at a position in close proximity to the line of the predetermined color.

25. The apparatus according to claim 23, wherein said correcting means corrects the output color of the object pixel in such a manner that only one color representing the predetermined color is used and the density thereof is maximized when said discriminating means has determined that the object pixel resides on part of a line of the predetermined color; and said correcting means lowers the value of each color component of the output color of the object pixel when said discriminating means has determined that the object pixel resides not on part of a line of the predetermined color but at a position in close proximity to the line of the predetermined color.

26. The apparatus according to claim 23, wherein the predetermined color is black.

27. The apparatus according to claim 26, wherein said extracting means calculates the degree of the color black of the object pixel by calculating the difference between a maximum component and a minimum component of each color component of the inputted object pixel and adding the difference to the maximum component.

28. The apparatus according to claim 23, wherein said discriminating means comprises:

memory means for storing and preserving the degree of the predetermined color, extracted by said extracting means, in close proximity to a position of the object pixel;

first binarizing means for generating a binary signal based upon information stored in said memory means, said binary signal representing whether a degree of the predetermined color at the position of the object pixel is higher than that at the position of a pixel nearby; and second binarizing means for generating a binary signal which represents whether a change in the predetermined color is larger than a predetermined value at the position of the object pixel stored by said memory means.

29. The apparatus according to claim 28, wherein said discriminating means further comprises:

third binarizing means for outputting a binary signal, based upon the binary signal generated by said first binarizing means, which represents whether pixels having a high degree of the predetermined color in close proximity to the position of the object pixel are scattered in a discontinuous state;

wherein the position of said object pixel being determined to reside on part of a line of the predetermined color when (a) the degree of predetermined color of the object pixel is high and (b) pixels, which are in close proximity to the object pixel, having a high degree of the predetermined color are determined to exist in a continuous state; and the object pixel being determined to reside not on part of a line of predetermined color but at a position in close proximity to the line of the predetermined color when (a) the degree of the predetermined color of the object pixel is low and (b) pixels, which are in close proximity to the object pixel, having a high degree of the predetermined color are determined to exist in a continuous state.

30. The apparatus according to claim 23, further comprising recording means for recording an image using data representing the output color of the object pixel processed by said correcting means.

31. The apparatus according to claim 30, wherein said recording means comprises an ink-jet printer for recording an image using ink having m-levels of density for each color component;

said correcting means performing recording using only one ink of maximum density, which represents the predetermined color, as the output color of the object pixel when said discriminating means has determined that the object pixel resides on part of a line of the predetermined color;

said correcting means performing recording using ink of a density lower than that of an ink having a given density with regard to color components other than at least the color components of the predetermined color of the object pixel when said discriminating means has determined that the object pixel resides not on part of a line of the predetermined color but at a position in close proximity to the line of the predetermined color.

32. The apparatus according to claim 30, wherein said recording means comprises an ink-jet printer for recording a tone image using ink for each color component and controlling the number of times the ink is discharged at the same position;

said correcting means performing recording by discharging one color ink, which represents the predetermined color, a plurality of times as the output color of the object pixel when said discriminating means has determined that the object pixel resides on part of a line of the predetermined color;

said correcting means performing recording by discharging ink a number of times less than a given number of times with regard to color components other than the color components of the predetermined color of the object pixel when said discriminating means has determined that the object pixel resides not on part of a line of the predetermined color but at a position in close proximity to the line of the predetermined color.

33. The apparatus according to claim 30, wherein said recording means includes a recording head which discharges ink droplets by utilizing film boiling produced by thermal energy.

* * * * *

UNITED STATES PATENT AND TRADEMARK OFFICE
CERTIFICATE OF CORRECTION

PATENT NO. : 5,315,382  
DATED : May 24, 1994  
INVENTOR(S) : Hiroshi TANIOKA

Page 1 of 2

It is certified that error appears in the above-indentified patent and that said Letters Patent is hereby corrected as shown below:

COLUMN 1:

Line 20, "do" should read --does--.

COLUMN 6:

Line 19, "represents" should be deleted.

COLUMN 8:

Line 47, "83-1" should read --83-3--.

COLUMN 18:

Line 41, "component," should read --component--.

UNITED STATES PATENT AND TRADEMARK OFFICE
CERTIFICATE OF CORRECTION

PATENT NO. : 5,315,382  Page 2 of 2
DATED : May 24, 1994
INVENTOR(S) : Hiroshi TANIOKA It is certified that error appears in the above-indentified patent and that said Letters Patent is hereby corrected as shown below:

COLUMN 21:

Line 47, "component," should read --component--.

Signed and Sealed this

Twenty-first Day of February, 1995

Attest:

BRUCE LEHMAN

Attesting Officer        Commissioner of Patents and Trademarks